US010045384B2

(12) United States Patent
Lee et al.

(10) Patent No.: US 10,045,384 B2
(45) Date of Patent: Aug. 7, 2018

(54) METHOD FOR MANAGING LINK FAILURE OF USER EQUIPMENT SIMULTANEOUSLY CONNECTED TO MULTIPLE RATS AND DEVICE FOR PERFORMING SAME

(71) Applicant: LG Electronics Inc., Seoul (KR)

(72) Inventors: Eunjong Lee, Seoul (KR); Jaehoon Chung, Seoul (KR); Hyeyoung Choi, Seoul (KR); Heejeong Cho, Seoul (KR); Genebeck Hahn, Seoul (KR)

(73) Assignee: LG Electronics Inc., Seoul (KR)

( * ) Notice: Subject to any disclaimer, the term of this patent is extended or adjusted under 35 U.S.C. 154(b) by 226 days.

(21) Appl. No.: 14/912,867

(22) PCT Filed: Jul. 1, 2014

(86) PCT No.: PCT/KR2014/005853
§ 371 (c)(1),
(2) Date: Feb. 18, 2016

(87) PCT Pub. No.: WO2015/026055
PCT Pub. Date: Feb. 26, 2015

(65) Prior Publication Data
US 2016/0205578 A1 Jul. 14, 2016

Related U.S. Application Data

(60) Provisional application No. 61/869,075, filed on Aug. 23, 2013.

(51) Int. Cl.
*H04W 76/02* (2009.01)
*H04W 36/18* (2009.01)
(Continued)

(52) U.S. Cl.
CPC ......... *H04W 76/022* (2013.01); *H04W 24/10* (2013.01); *H04W 36/02* (2013.01);
(Continued)

(58) Field of Classification Search
CPC .. H04W 76/022; H04W 36/08; H04W 76/023
See application file for complete search history.

(56) References Cited

U.S. PATENT DOCUMENTS

2009/0175241 A1\* 7/2009 Ohta ................. H04W 36/02
370/331
2011/0002305 A1\* 1/2011 Park ................. H04W 36/0066
370/331
(Continued)

FOREIGN PATENT DOCUMENTS

KR 10-2013-0076861 A 7/2013
WO 2012/135793 A2 10/2012
WO 2012/136374 A2 10/2012

OTHER PUBLICATIONS

Ericsson, Nortel, Verizon Wireless, Cisco: "Solutions to minimize packet losses for handover between E-UTRAN and HRPD", 3GPP TSG SA WG2 Architecture—S2#60, S2-074114, Oct. 8-12, 2007.
(Continued)

*Primary Examiner* — Omoniyi Obayanju
(74) *Attorney, Agent, or Firm* — Dentons US LLP

(57) ABSTRACT

A method for managing link failure, according to one embodiment of the present invention, comprises the steps of: receiving a link failure report (LFR) for notifying that a link between user equipment and an base station of a second RAT has been disassociated; requesting an entity of a first RAT, which manages interworking between the first RAT and the second RAT, to switch a flow of downlink data for the user equipment, which is to be transmitted to the base station of the second RAT, to a base station of the first RAT; establishing a direct tunnel between the base station of the first RAT and the base station of the second RAT by using an identifier of the base station of the second RAT, which is included in the LFR of the user equipment; and relaying the downlink data for the user equipment, which has been
(Continued)

buffered in the base station of the second RAT up to before the switch of the flow after the disassociation of the link, from the base station of the second RAT to the user equipment.

4 Claims, 19 Drawing Sheets

(51) Int. Cl.
*H04W 24/10* (2009.01)
*H04W 36/02* (2009.01)
*H04W 36/30* (2009.01)
*H04W 76/12* (2018.01)
*H04W 92/20* (2009.01)
*H04W 36/14* (2009.01)
*H04W 76/15* (2018.01)

(52) U.S. Cl.
CPC ........... *H04W 36/18* (2013.01); *H04W 36/30* (2013.01); *H04W 76/12* (2018.02); *H04W 36/023* (2013.01); *H04W 36/14* (2013.01); *H04W 76/15* (2018.02); *H04W 92/20* (2013.01)

(56) References Cited

U.S. PATENT DOCUMENTS

| | | |
|---|---|---|
| 2011/0177815 A1 | 7/2011 | Jeong et al. |
| 2012/0082090 A1 | 4/2012 | Horn et al. |
| 2012/0294276 A1 | 11/2012 | Jaiswal et al. |
| 2016/0037406 A1* | 2/2016 | Centonza .............. H04W 36/04 370/332 |
| 2016/0269963 A1* | 9/2016 | Nigam .................. H04W 36/30 |

OTHER PUBLICATIONS

Y. Kitatsuji et al., "On Hardnover Procedure with Data Forwarding for Reducing Buffered User Data in Base Stations", Global Telecommunications Conference, 2009, Globecom 2009, IEEE, Nov. 30, 2009, pp. 1-8, XP031646436.

* cited by examiner

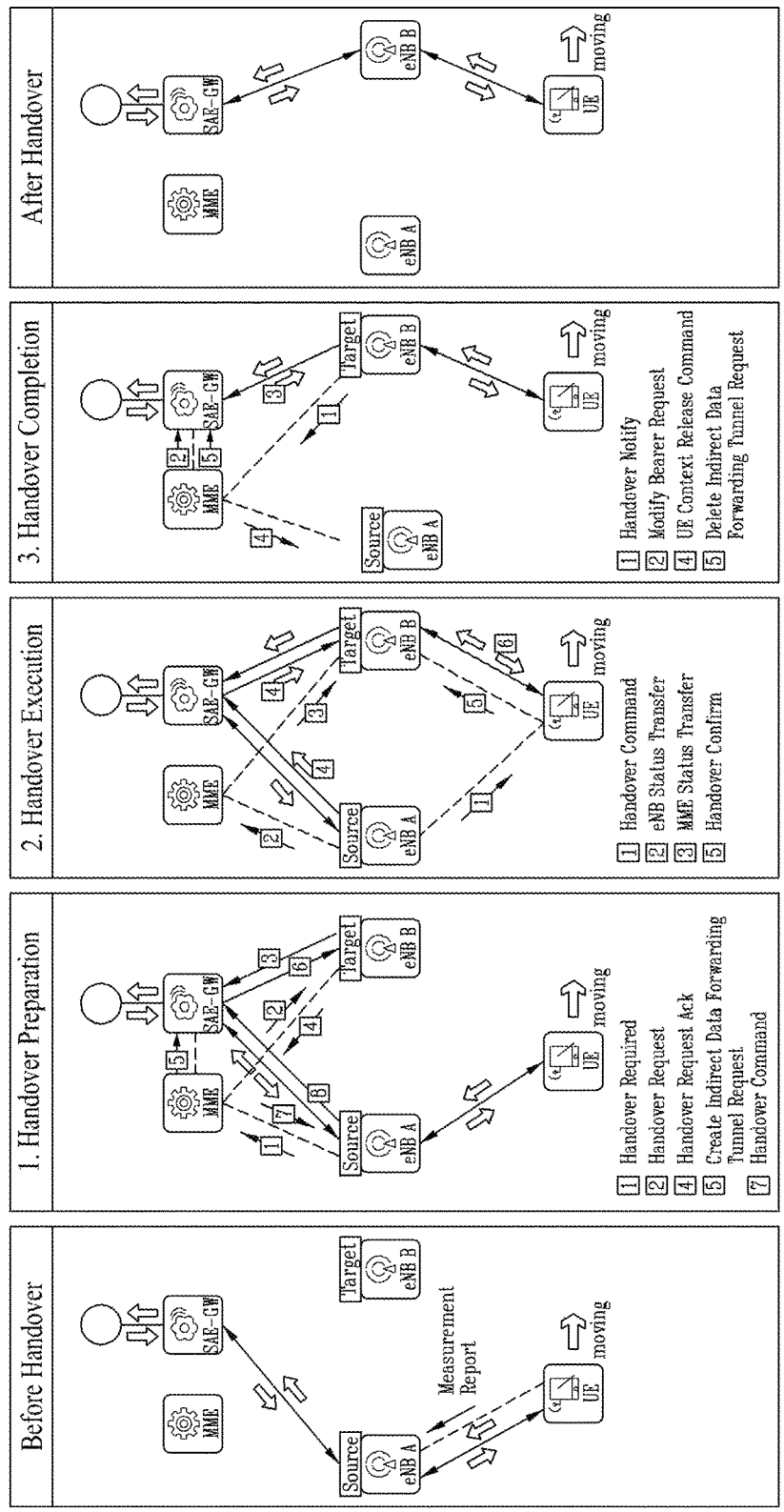

METHOD FOR MANAGING LINK FAILURE OF USER EQUIPMENT SIMULTANEOUSLY CONNECTED TO MULTIPLE RATS AND DEVICE FOR PERFORMING SAME

This application is a 35 USC § 371 National Stage entry of International Application No. PCT/KR2014/005853 filed on Jul. 1, 2014, and claims priority to U.S. Provisional Application No. 61/869,075 filed on Aug. 23, 2013, all of which are hereby incorporated by reference in their entireties as if fully set forth herein.

TECHNICAL FIELD

The present invention relates to mobile communication, and more particularly, to a method for managing link failure of a user equipment (UE) in an multi-RAT environment and a base station and UE for performing the method.

BACKGROUND ART

Multi-RAT in which heterogeneous communication networks are merged has been researched. For example, a multi-RAT user equipment (UE) supports both a cellular network and a wireless local area network (WLAN). Such a multi-RAT UE can selectively access any one of a plurality of RATs but cannot simultaneously access the plurality of RATs. That is, even when a UE has multi-RAT capabilities, the UE cannot simultaneously transmit and receive data via different RATs.

In a multi-RAT environment, when link with a specific RAT is unpredictably disconnected while a UE accesses the specific RAT and transmits and receives data, the UE terminates access to the specific RA and accesses another RAT. However, there is a problem in that data that has been transmitted and received to and from the specific RAT cannot be seamlessly transmitted and received to and from another newly accessed RAT.

DISCLOSURE

Technical Problem

An object of the present invention devised to solve the problem lies in a method and apparatus for seamlessly switching data flow transmitted and received by a user equipment to another RAT in a UE that accesses a multi-RAT when link failure for the specific RAT occurs in the UE that accesses the multi-RAT.

It is to be understood that both the foregoing general description and the following detailed description of the present invention are exemplary and explanatory and are intended to provide further explanation of the invention as claimed.

Technical Solution

The object of the present invention can be achieved by providing a method for managing link failure of a user equipment (UE) that transceives data with a base station (BS) of a second radio access technology (RAT) by a BS of a first RAT, the method including receiving link failure report (LFR) indicating that link between the UE and the BS of the second RAT is disconnected, from the UE, requesting an entity of the first RAT which manages interworking between the first RAT and the second RAT to switch flow of downlink data of the UE to the BS of the first RAT, the downlink data of the UE has been transmitted to the BS of the second RAT, establishing a direct tunnel between the BS of the first RAT and the BS of the second RAT using an identifier (ID) of the BS of the second RAT, included in the LFR of the UE, and relaying downlink data of the UE, buffered in the BS of the second RAT, from the BS of the second RAT until the flow is switched after the link is disconnected.

In another aspect of the present invention, provided herein is a method for controlling link failure by a user equipment (UE) that simultaneously accesses multi-radio access technology (RAT), the method including transmitting disassociation notification for requesting switch of link with a base station (BS) of a second RAT to a BS of a first RAT, to the BS of the second RAT, transmitting link failure report (LFR) indicating that link with the BS of the second RAT is disconnected to the BS of the first RAT, and receiving downlink data of the UE, buffered in the BS of the second RAT, from the BS of the first RAT after the link is disconnected, wherein the downlink data of the UE, buffered in the BS of the second RAT, is received by the UE through a direct tunnel between the BS of the first RAT and the BS of the second RAT, established based on downlink LFR of the UE.

In another aspect of the present invention, provided herein is a base station (BS) of a first radio access technology (RAT) for managing link failure of a user equipment (UE) that transceives data with a base station (BS) of a second RAT, the BS including a transceiving module for transmitting and receiving a wired or wireless signal, and a processor for controlling the transceiving module, wherein the processor controls the transceiving module to receive link failure report (LFR) indicating that link between the UE and the BS of the second RAT is disconnected, from the UE, to request an entity of the first RAT which manages interworking between the first RAT and the second RAT to switch flow of downlink data of the UE to the BS of the first RAT, the downlink data of the UE has been transmitted to the BS of the second RAT, to establish a direct tunnel between the BS of the first RAT and the BS of the second RAT using an identifier (ID) of the BS of the second RAT, included in the LFR of the UE, and to relay downlink data of the UE, buffered in the BS of the second RAT, from the BS of the second RAT until the flow is switched after the link is disconnected.

In another aspect of the present invention, provided herein is a user equipment (UE) that simultaneously accesses multi-radio access technology (RAT), the UE including a radio frequency (RF) module for transmitting and receiving a wireless signal, and a processor for controlling the RF module, wherein the processor controls the RF module to transmit disassociation notification for requesting switch of link with a base station (BS) of a second RAT to a BS of a first RAT, to the BS of the second RAT, to transmit link failure report (LFR) indicating that link with the BS of the second RAT is disconnected to the BS of the first RAT, and to receive downlink data of the UE, buffered in the BS of the second RAT, from the BS of the first RAT after the link is disconnected, and the downlink data of the UE, buffered in the BS of the second RAT, is received by the UE through a direct tunnel between the BS of the first RAT and the BS of the second RAT, established based on downlink LFR of the UE.

Advantageous Effects

According to an embodiment of the present invention, even if link failure for a specific RAT occurs in a user equipment (UE) that accesses a multi-RAT, the UE may seamlessly switch data flow transmitted and received by the UE to another RAT so as to prevent data loss and enhance system efficiency.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIGS. 2A to 2D are diagrams for explanation of an S1 handover procedure in 3GPP LTE.

BEST MODE

Figure 1A:
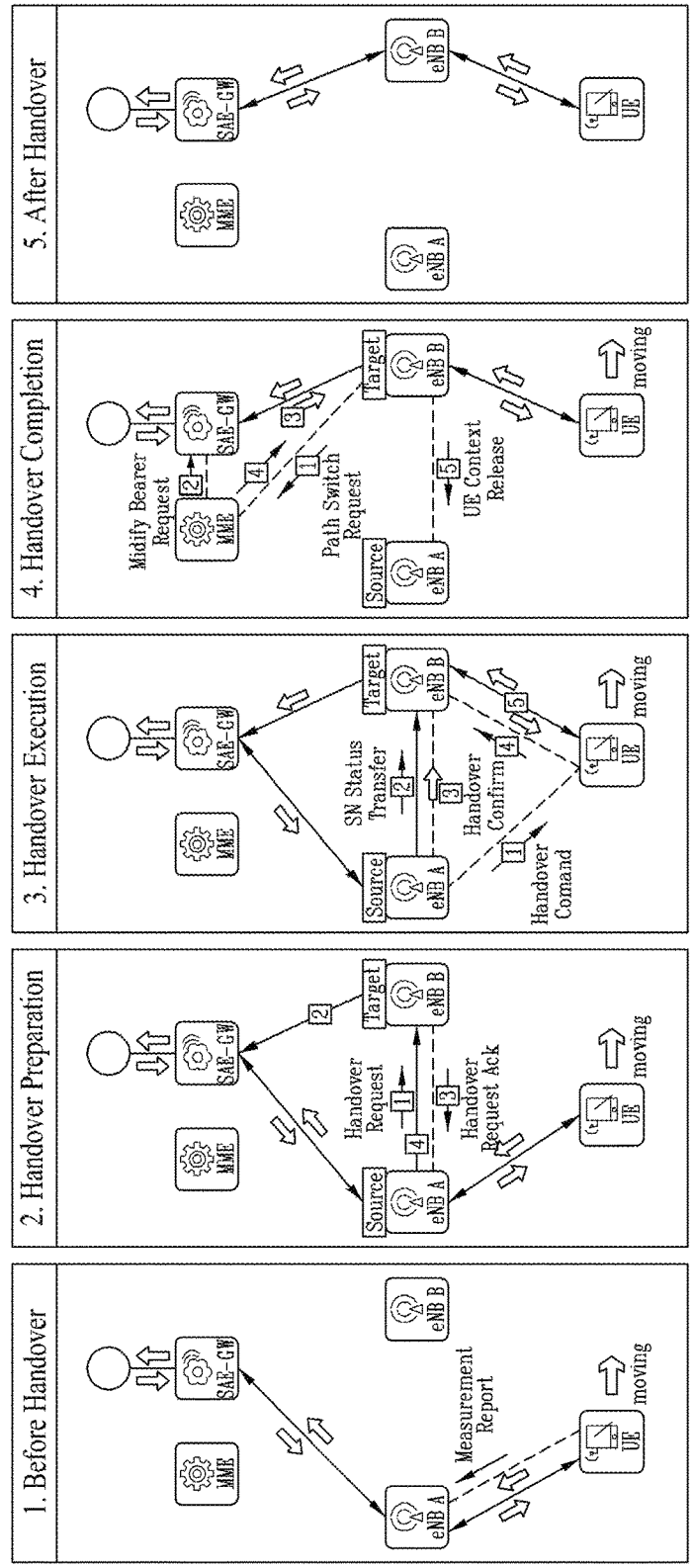
FIGS. 1A to 1D are diagrams for explanation of a handover procedure of an X2 interface in 3GPP LTE.

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced. The detailed description includes details for the purpose of providing an understanding of the present invention. However, it will be apparent to those skilled in the art that these teachings may be implemented and practiced without these specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

In the following description, a first RAT is a cellular system or a cellular network. For example, assume that the first RAT is a 3GPP LTE or LTE-A system. However, the first RAT may be implemented by another arbitrary cellular system except for unique items of the 3GPP LTE or LTE-A system. A second RAT is a wireless communication system or a wireless communication network using a wireless communication method different from that of the first RAT and may be a data transmission system having coverage relatively smaller than that of the first RAT. For example, the second RAT may be a wireless local area network (WLAN) system such as WLAN or Wi-Fi, but is not limited thereto.

In the following description, assume that a terminal is a generic term for a mobile or fixed user-end device such as a user equipment (UE), a mobile station (MS), an advanced mobile station (AMS), a station (STA) and the like. In addition, assume that a base station is a generic name for any node, which communicates with a terminal in a first RAT or a second RAT, such as a Node B, an eNode B, a base station, an access point (AP) and the like. Although a 3GPP LTE/LTE-A, an IEEE 802.16 or an IEEE 802.11 system is focused upon in the present specification, the present invention is applicable to various different communication systems. In the following description, a base station of a second RAT is a generic name for any node, which communicates with a terminal in a second RAT, such as an AP.

In the first RAT, a UE may receive information from a base station in downlink and transmit information in uplink. Information transmitted or received by the UE includes data and a variety of control information and physical channels differ according to type and usage of information transmitted or received by the UE.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied with radio technology such as UTRA (Universal Terrestrial Radio Access) or CDMA2000. TDMA may be embodied with wireless (or radio) technology such as GSM (Global System for Mobile communications)/GPRS (General Packet Radio Service)/EDGE (Enhanced Data Rates for GSM Evolution). OFDMA may be embodied with wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the UMTS (Universal Mobile Telecommunications System). 3GPP (3rd Generation Partnership Project) LTE (long term evolution) is a part of the E-UMTS (Evolved UMTS), which uses E-UTRA. 3GPP LTE employs OFDMA in downlink and employs the SC-FDMA in uplink. LTE-Advanced (LTE-A) is an evolved version of the 3GPP LTE.

It should be noted that specific terms disclosed in the present invention are proposed for convenience of description and better understanding of the present invention, and the use of these specific terms may be changed to another format within the technical scope or spirit of the present invention.

FIGS. 1A to 1D are diagrams for explanation of a handover procedure of an X2 interface in 3GPP LTE.

Figure 1B:
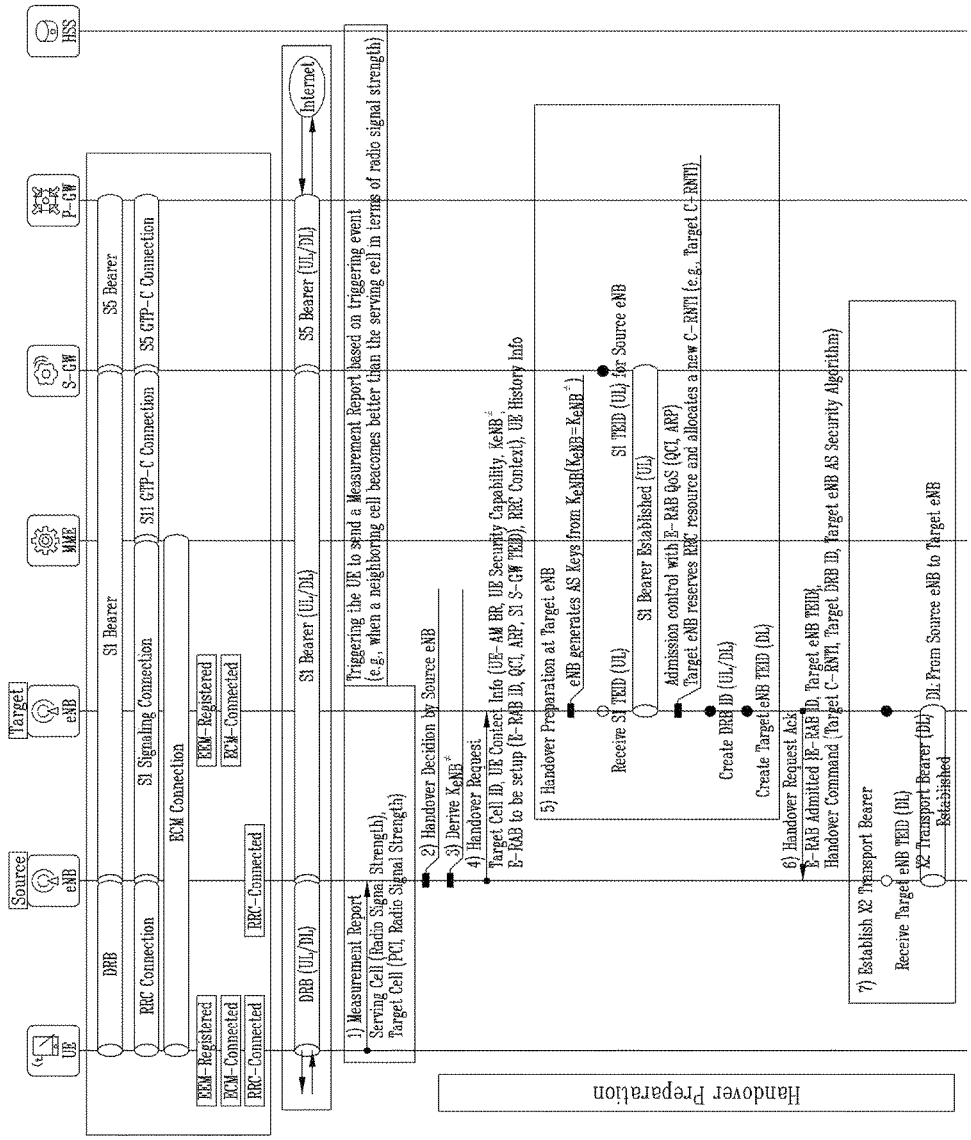
Figure 1C:
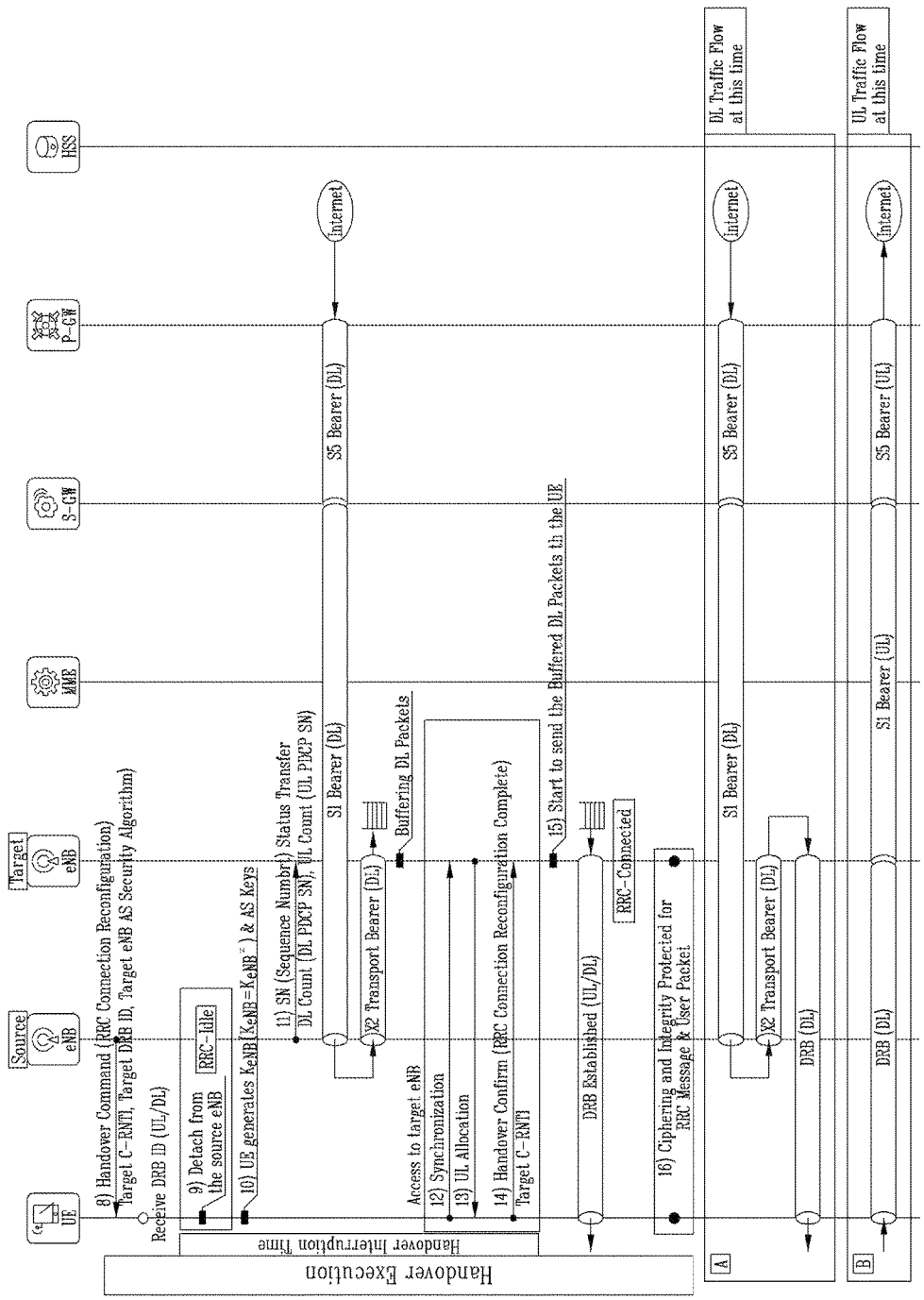
Figure 1D:
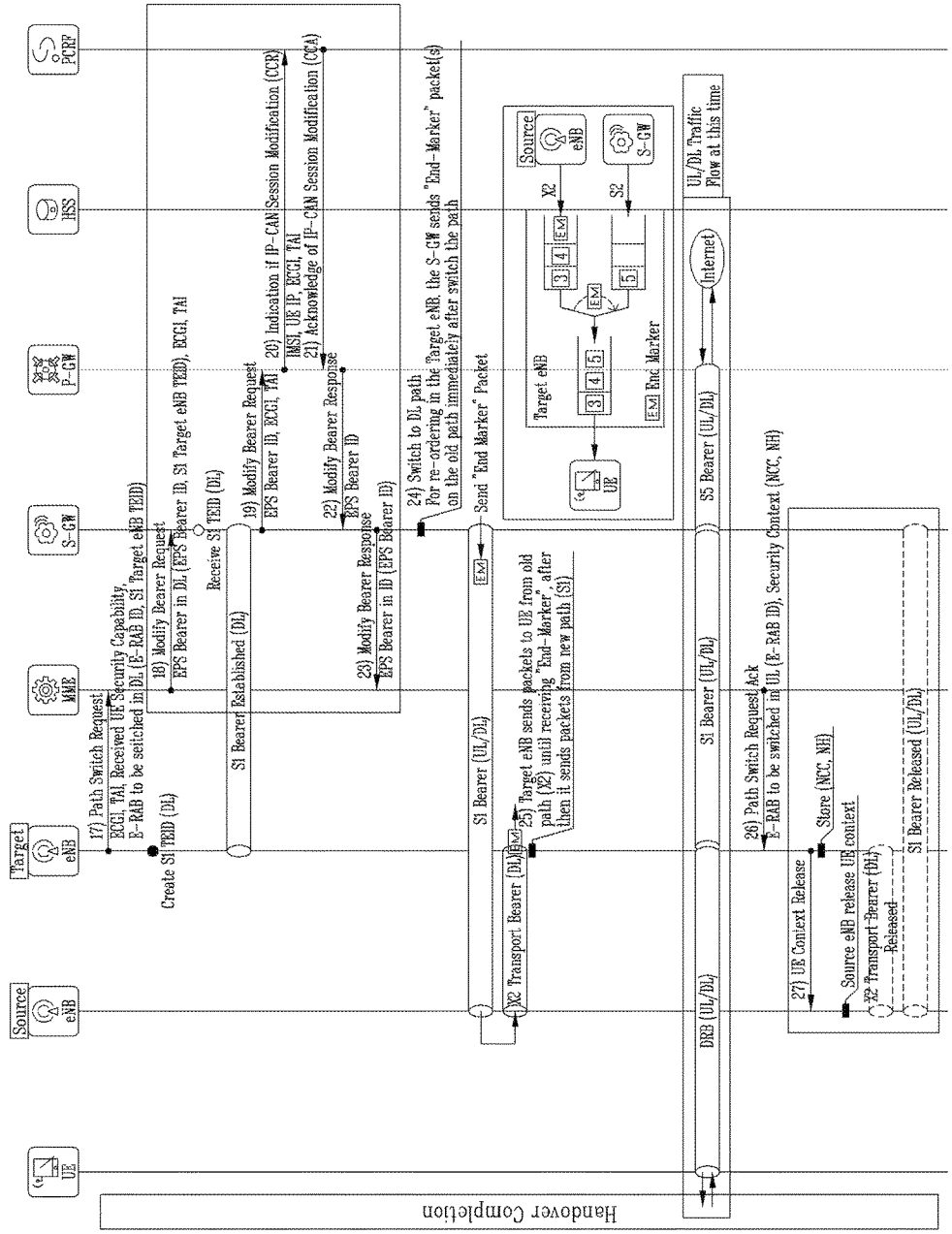
Figure 1E:
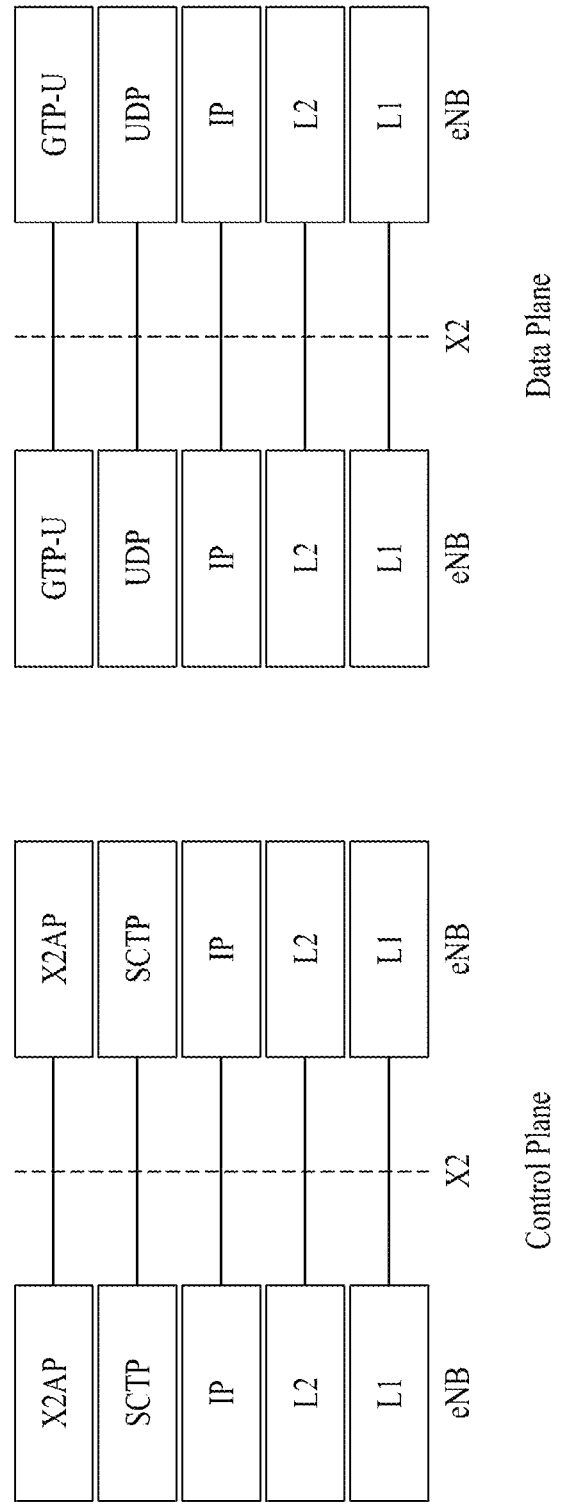
FIG. 1E is a diagram illustrating a protocol stack of an X2 interface in 3GPP LTE.

The X2 interface illustrated in FIG. 1E will be briefly described.

The X2 interface is defined as an interface between eNBs in LTE. In a previous generation network, an eNB can know state information of a neighboring eNB only through control of a packet core node, but in an LTE network, an eNB can transmit and receive state information to and from neighboring eNBs through the X2 interface and can also perform handover without intervention of an evolved packet core (EPC) node.

Messages associated with a mobility management function in the X2 interface will now be described below.

Handover Request: This is a message used in a handover preparation step, is transmitted to a target eNB by a source eNB, and includes a UE context of a user.

Handover Request Acknowledge: This is a message used in a handover preparation step and is transmitted to a source eNB by a target eNB when resource allocation is successfully performed in the target eNB.

Handover Preparation Failure: This is a message used in a handover preparation step and is transmitted to a source eNB by a target eNB when resource allocation fails in the target eNB.

SN Status Transfer: This is a message used in a handover execution step, is transmitted to a target eNB by a source eNB, and indicates a first packet to be transmitted and received.

UE Context Release: This is a message used in a handover completion and is transmitted to a source eNB by a target eNB to request UE context release.

Handover Cancel: This is a message used in a handover preparation step and is transmitted to a target eNB when a source eNB intends to cancel proceeding handover preparation.

Referring to FIG. 1A, the X2 handover procedure may include 2. Handover preparation, 3. Handover execution, and 4. Handover completion processes.

1. Before Handover

An eNB A as a serving eNB of a UE may transmit a measurement configuration message to the UE. The UE may measure an adjacent cell and at least one serving cell according to the measurement configuration. When the measurement result of a cell satisfies a reporting condition, the UE may transmit measurement report to the eNB A.

2. Handover Preparation

The eNB A may determine X2 handover based on the measurement report. The eNB A may request an eNB B as a target eNB for handover. The eNB B may transmit ACK to handover request so as to indicate that handover preparation is successful to the eNB A. The eNB B may prepare to transmit a UL packet through a UL S1 bearer and prepare to receive a DL packet through a DL X2 bearer. A direct tunnel for forwarding the DL packet may be generated between the eNB A and the eNB B. FIG. 1B is a diagram illustrating a detailed procedure of the handover preparation. 5) of FIG. 1B illustrates generation of a UL S1 bearer. 7) of FIG. 1B illustrates generation of a DL X2 transport bearer through an X2 interface between the eNB A and the eNB B.

3. Handover Execution

Referring back to FIG. 1A, the eNB A may instruct the UE to perform handover. The UE may disconnect access to the eNB A and access the eNB B according to the handover instruction. The eNB A may transmit sequence number (SN) information of a DL/UL packet to the eNB B. The eNB A may forward the DL packet to the eNB B through the X2 bearer. The eNB B may buffer the forwarded DL packet and transmit the DL packet when the UE accesses the eNB B. FIG. 1C is a diagram illustrating a detailed procedure of the handover execution. Although the UE transmits and receives DL/UL packets through the eNB B, in reality, the DL packet is transmitted along a path of gateway (GW)→eNB A→eNB B→UE. In addition, until the eNB B is successfully accessed, the eNB B may buffer the DL packet. As illustrated in 11) of FIG. 1C, the eNB A may transmit a SN status transfer message to the eNB B such that the eNB B sequentially transmits packets. The SN status transfer message may include DL count and UL count. The DL count may be count of a first packet to be transmitted to the UE and the UL count may be count of a first packet to be received from the UE.

4. Handover Completion

Referring back to FIG. 1A, the eNB B may request path change to a mobility management entity (MME). The MME may request a system architecture evolution gateway (SAE-GW) to correct the S1 bearer. The SAE-GW may change a path to the eNB B from the eNB A. The MME indicates the path change to the eNB B. The eNB B may request UE context release to the eNB A. FIG. 1D is a diagram illustrating a detailed procedure of the handover completion. When the S1 bearer path is changed through an interface between an MME and a serving-GW (S-GW), the S-GW may indicate that a packet transmitted to the eNB A is a last packet through an end marker (EM) bit. The S-GW may immediately transmit data after EM bit transmission to the eNB B. The eNB B may first transmit a DL packet that is transmitted together with the EM bit to the UE and may sequentially transmit packets received from the S-GW to the UE. When the eNB receives a path change completion message from the MME, the eNB B may request the eNB A for UE context release.

When handover is completed, the eNB B becomes a serving eNB of the UE.

FIGS. 2A to 2D are diagrams for explanation of an S1 handover procedure in 3GPP LTE.

Figure 2B:
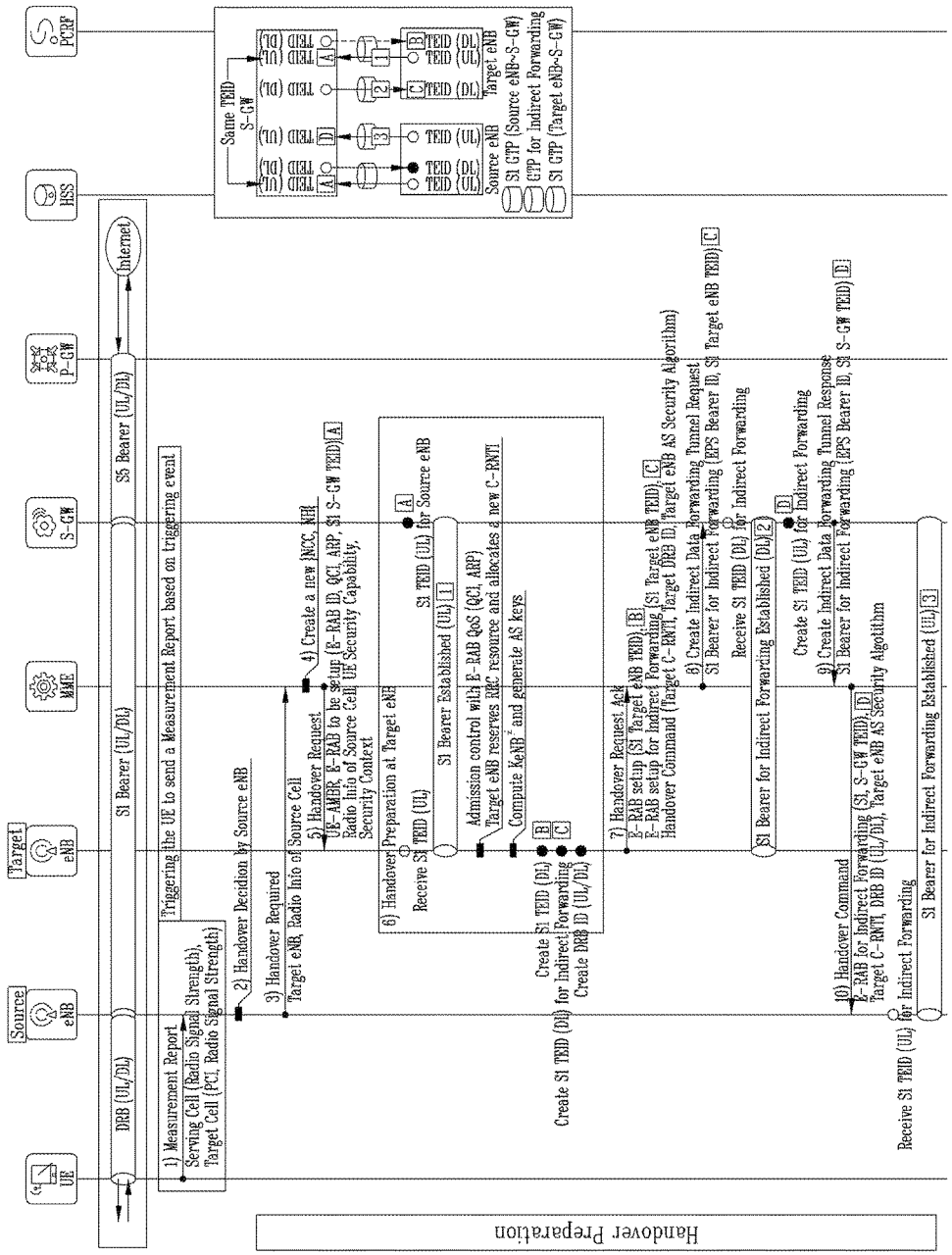
Figure 2C:
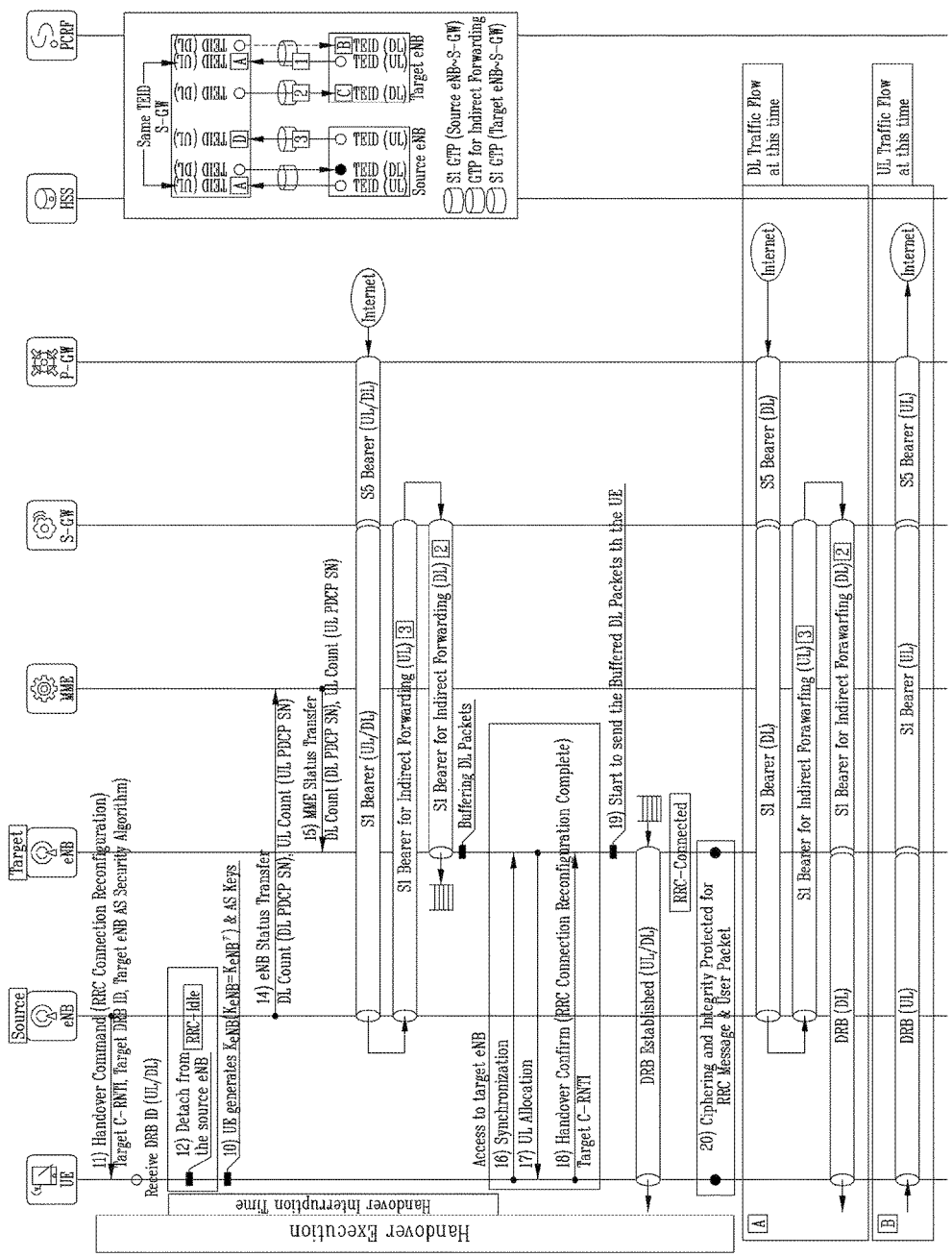
Figure 2D:
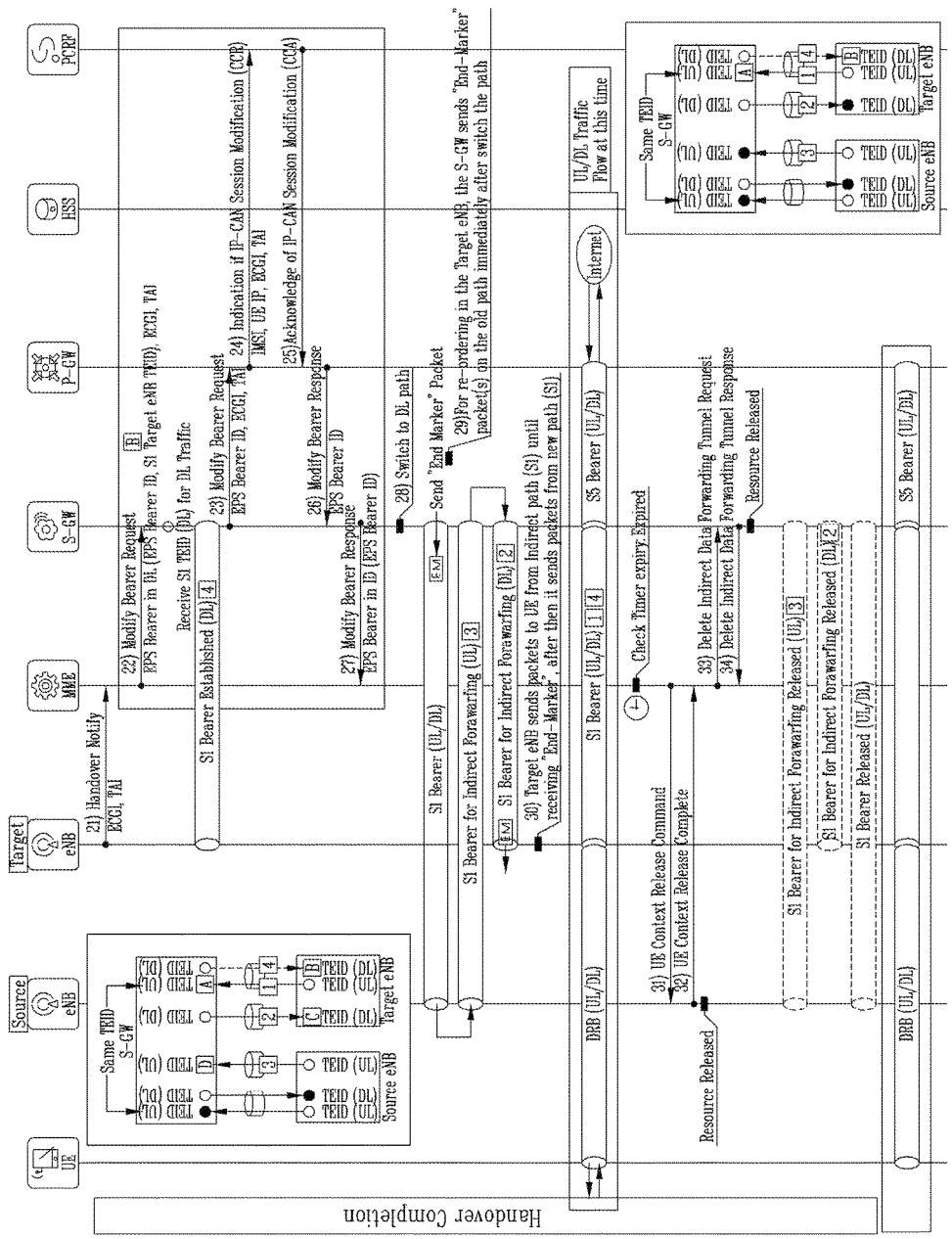
Figure 2E:
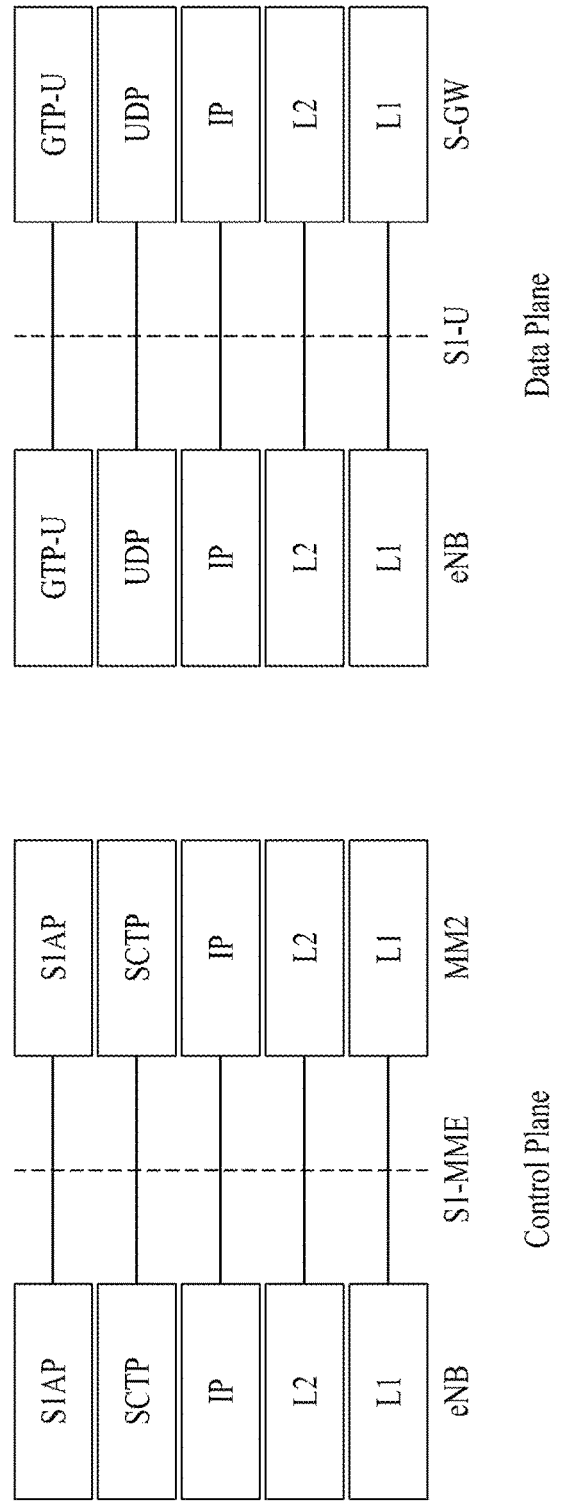
FIG. 2E is a diagram illustrating a protocol stack of an S1 interface in 3GPP LTE.

An S1 interface illustrated in FIG. 2E will now be briefly described. The S1 interface may be an interface for connection between an eNB and an EPC, and the eNB may communicate with an MME through S1 AP signaling in a control plane and communicate with the S-GW through a GPRS tunneling protocol (GTP) tunnel in a user plane.

A message transmitted based on the S1 interface is as follows.

Handover Required: This is a message used in a handover preparation step, is transmitted to an MME by a source eNB, and includes target eNB information and radio related information in a source cell.

Handover Request: This is a message used in a handover preparation step, is transmitted to a target eNB by a MME, and includes UE context of a user.

Handover Request Acknowledge: This is a message used in a handover preparation step and is transmitted to an MME by a target eNB when resource allocation to a UE is successfully performed in the target eNB. The target eNB may allocate and transmit a DL S1 tunneling endpoint identifier (TEID) for an S1 bearer to be used after handover and DL S1 TEID for an S1 bearer (indirect tunnel) to be used for DL packet transmission during handover.

Handover Command: This is a message used in a handover preparation step and is transmitted to a source eNB by an MME. Information (target C-RNTI, target eNB AS security algorithm, DRB ID, etc.) required when a UE accesses a target eNB and UL S1 TEID allocated for an S1 bearer (indirect tunnel) to be used for DL packet transmission during handover of an S-GW may be transmitted.

eNB Status Transfer: This is a message used in a handover execution step, is transmitted to an MME by a source eNB, and indicates a first packet to be transmitted and received.

MME Status Transfer: This is a message used in a handover execution step, is transmitted to a target eNB by an MME, and indicates a first packet to be transmitted and received.

Handover Notify: This is a message used in a handover completion step, is transmitted to an MME by a target eNB, and indicates that a UE has completed handover to a target eNB.

UE Context Release Command: This is a message used in a handover completion step, is transmitted to a source eNB by an MME, and requests UE context release.

UE Context Release Complete: This is a message used in a handover completion step, is transmitted to an MME by a source eNB, and indicates that UE context has been released.

Figure 3A:
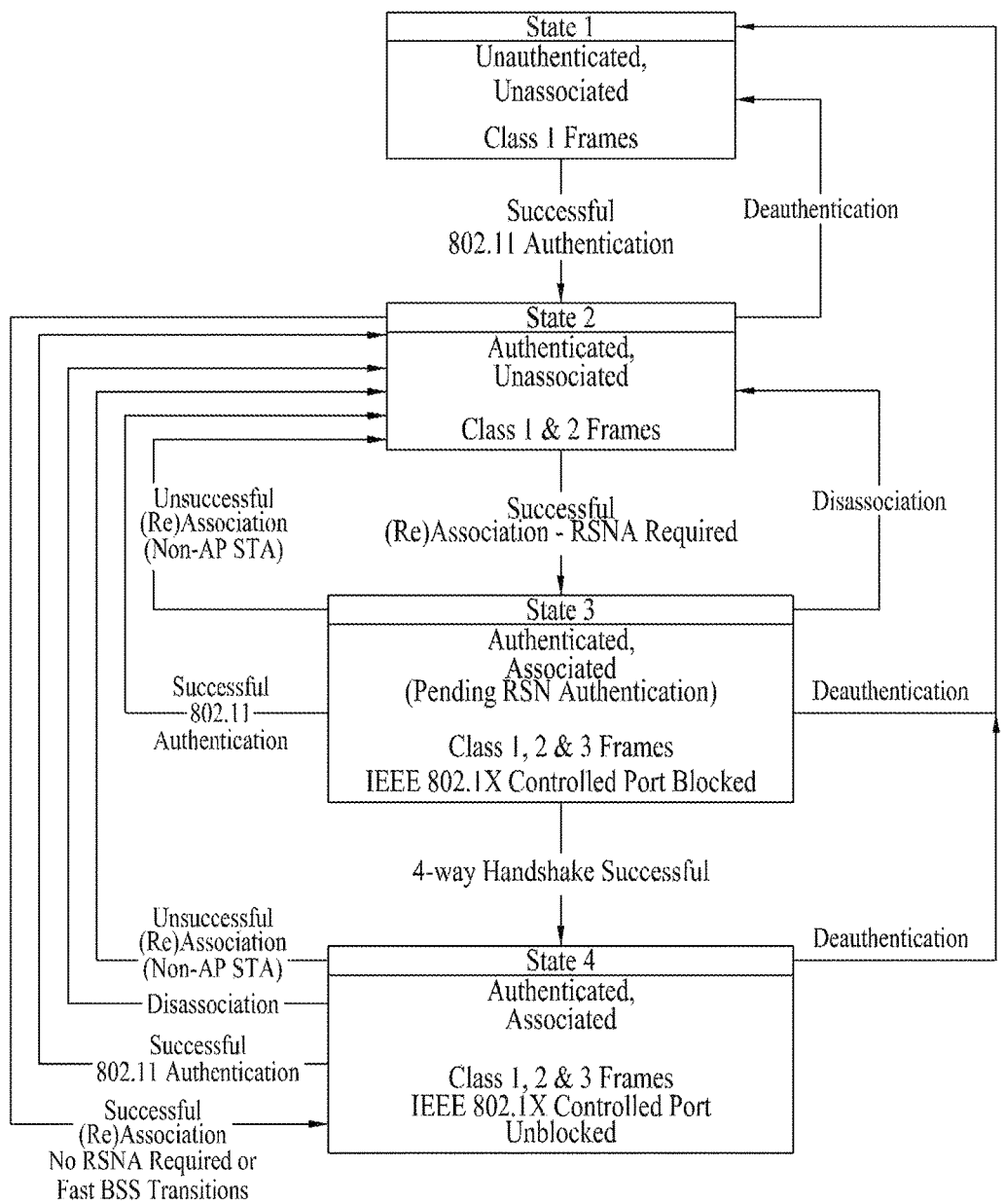
FIG. 3A is a state diagram in IEEE 802.11.

FIG. 3A is a state diagram in IEEE 802.11.

Referring to FIG. 3A, the state in EEE 802.11 includes a total of four states. State 1 is Deauthenticated and Disassociated states. State 2 is Disassociated and Authenticated states.

Figure 3B:
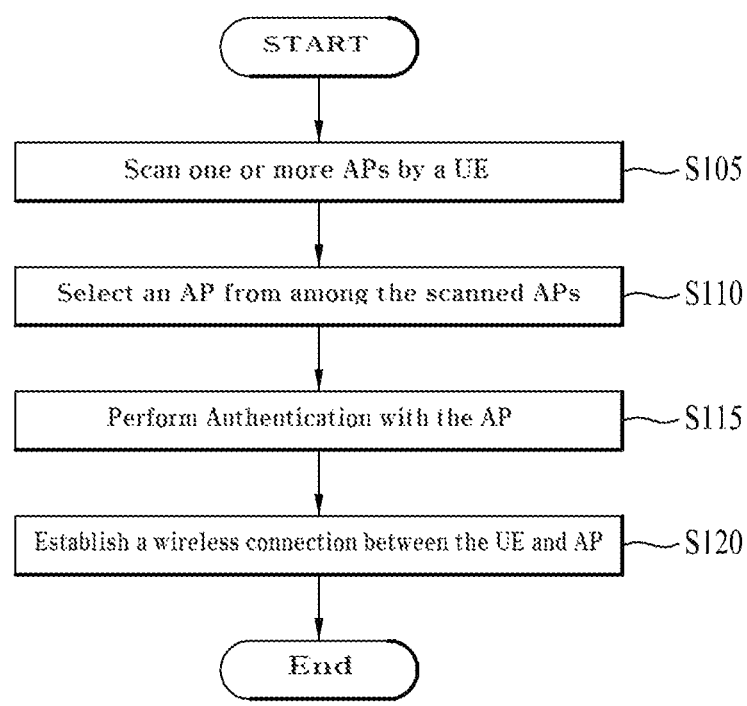
FIG. 3B is a diagram illustrating a connection procedure in IEEE 802.11.

FIG. 3B is a diagram illustrating a wireless local area network (WLAN) connection procedure according to IEEE 802.11.

Referring to FIG. 3B, a UE may scan an access point (AP) of a WLAN positioned adjacent to the UE (S105). A method for scanning of an AP may be classified into passive scanning and active scanning. According to the passive scanning, the AP may periodically transmit a beacon frame. The UE may receive the beacon frame and transmit a response message to the beacon frame to the AP so as to scan the AP. According to the active scanning, the AP may monitor a channel without transmission of the beacon frame. When a UE in coverage of the AP transmits a probe request, the AP may transmit a probe response to the UE so as to scan the AP.

The UE may select any one of the scanned APs (S110). The UE may synchronize an AP with the selected AP and collect information about the selected AP. The UE may authenticate the selected AP (S115). A method for authenticating a UE by an AP may include open system authentication in which an AP surely performs an authentication procedure on an authentication request of the UE and shared key authentication for authenticating a UE through a shared key set for the AP. The UE and the AP may transmit and receive an authentication frame for authentication. Then, a wireless connection between the UE and the AP may be established (S220). The UE may transmit an association request to the AP and the AP may allocate an association ID to the UE through the association response.

According to a conventional method, in order to scan an AP, the AP needs to periodically transmit a beacon frame (passive scanning) or needs to continuously monitor a probe request from a UE (active scanning). Accordingly, when the AP is turned off or is in an idle mode, a beacon frame of the AP is not transmitted and a probe request of the AP cannot be received, and thus the UE cannot scan the AP according to the conventional method.

IEEE 802.11 defines a doze mode as a power saving mode of a UE. The doze mode is a function of stopping an operation of a transceiver for a predetermined time period when a UE does not transmit data or there is no data to be transmitted to the UE in order to save power of the UE. In a method for switch to a doze method from an awake mode, a UE may specify a listen interval in an initial association request frame so as to switch the awake mode to the doze mode. In addition, as necessary, after the UE transmits a null data frame set with PM=1 and receives ACK to the null data frame, the UE may enter the doze mode. In the doze mode, the UE may briefly awake and check a beacon frame around at a time point in which the UE transmits a beacon frame. The UE may check traffic indication MAP information element (IE). In a method for switch to an awake mode from a doze mode, when a bit corresponding to an association ID (AID) is set to 1 in a traffic indication MAP (TIM), the UE may awake, insert the AID of the UE into a duration region of a power save(PS)-poll message, and transmit the message. The AP that receives the PS-poll frame may transmit data that is being buffered to the UE. When the buffered frame is one or more, a more data bit may be set to 1 to indicate that more frames are present to the UE.

A disassociation procedure of IEEE 802.11 may correspond to notification rather than request. When APs need to be removed from a network, the APs need to be disassociated from stables (or UEs). Disassociation may be performed via transmission of a disassociation frame, and in this regard, a disassociation frame includes a reason code. The reason code is listed as follows.

Disassociated due to inactivity

Disassociated because AP is unable to handle all currently associated STAs

Disassociated because sending STA is leaving (or has left) BSS

Disassociated because the information in the Power Capability element is unacceptable Disassociated because the information in the Supported Channels element is unacceptable Disassociated due to BSS Transition Management Disassociated because session terminated by SSP request Disassociated because of lack of SSP roaming agreement Disassociated for unspecified, QoS-related reason Disassociated because QoS AP lacks sufficient bandwidth for this QoS STA Disassociated because excessive number of frames need to be acknowledged, but are not acknowledged due to AP transmissions and/or poor channel conditions Disassociated because STA is transmitting outside the limits of its TXOPs Previous authentication no longer valid Deauthenticated because sending STA is leaving (or has left) IBSS or ESS Prior to description of a multi-RAT environment according to the present invention, an inter RAT technology in a conventional multi-RAT environment will be briefly described. The conventional inter RAT technology is designed based on request of a UE and thus does not require interworking between a wireless LAN and a cellular network. A specific network server may manage wireless LAN information and perform inter RAT handover according to request of the UE. In addition, even if the UE can simultaneously access multi-RAT, the UE accesses multiple RAT using a method for supporting only flow mobility/IP-flow mapping in a network level without control in a radio level.

Conventionally, a method for supporting multiple RAT by a UE may include IP flow mobility (IFOM) and multiple access PDN connectivity (MAPCON). The IFOM is a WLAN offloading technology of a DSMIPv6-based IP flow in 3G/WiFi seamless offload (Rel-10) of 3GPP. The dual stack mobile IPv6 (DSMIPv6) is a solution for simultaneously supporting IPv4 and IPv6 in a UE and a network and has been adapted because an existing IPv4 network also requires mobility support as IPv6 adaptation has been enlarged and mobility support has been developed as a core technology due to diversity of a mobile communication network. The IFOM is a client-based mobile Internet protocol (MIP) technology for detecting mobility of a UE and indicating the mobility to an agent by the UE. As an agent for managing mobility of a mobile node, a home agent (HA) is present, and the HA may use a flow binding table and a binding cache table. When the PMIPv6 is used, the IFOM may use only DSMIPv6 for the technological reason that it is difficult to manage an IP flow unit.

The MAPCON may be a technology for simultaneous multiple public data network (PDN) connectivity to different access point names (APNs), may be protocol independent, and may use all of the PMIPv6, the GTP, and the DSMIPv6. According to the MAPCON, all data flows that are being transmitted through one PDN are moved.

This conventional technology does not require any control connection between an AP and a cellular network and is performed based on request of a UE. However, in order to enhance overall efficiency of a network via use of multi-RAT, network-based tightly-coupled management is required rather than being dependent upon only request of the UE.

According to embodiments of the present invention, direct control connection may be established between different RATs so as to perform efficient and rapid inter-RAT interworking.

Figure 4A:
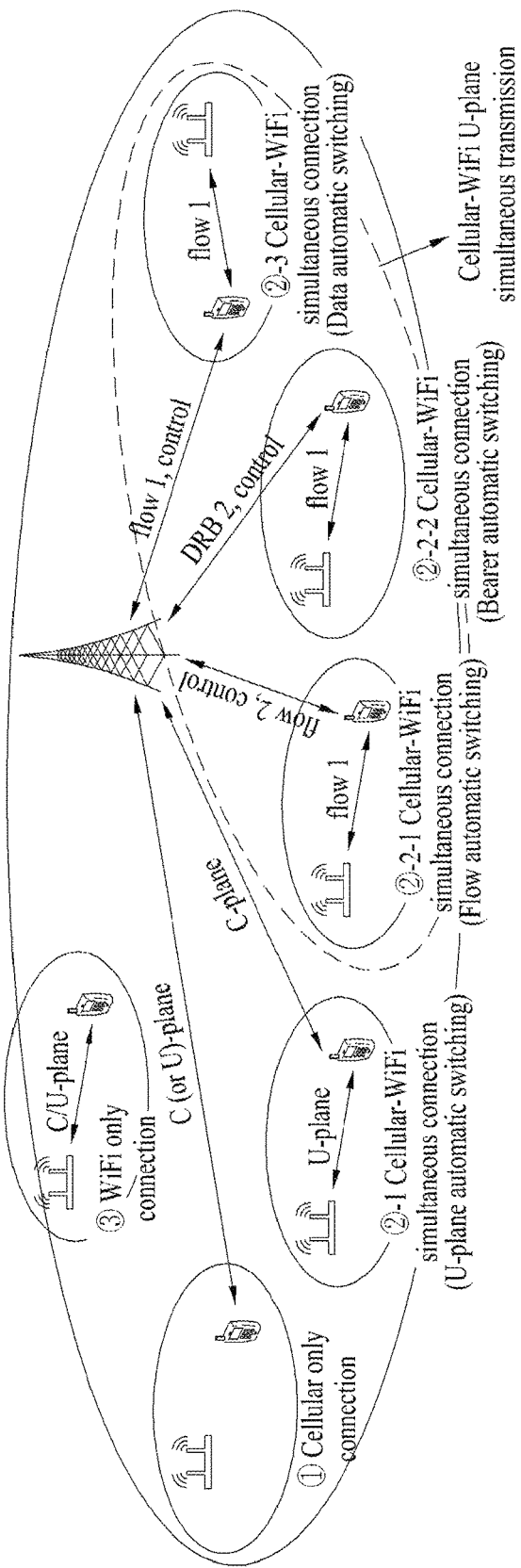
FIGS. 4A and 4B are diagrams illustrating a multi-RAT environment according to embodiments of the present invention.

FIG. 4A is a diagram showing a multi-RAT environment according to one embodiment of the present invention.

In $\hat{1}$, technical predefinition is necessary such that a UE performs Wi-Fi automatic switching/simultaneous transmission in a state of accessing only a cellular network. AP information management for interworking is performed at the network level (cellular-Wi-Fi) and Wi-Fi discovery and Wi-Fi network access are performed at the device level (cellular-device-Wi-Fi).

$\hat{2}$-1 to $\hat{2}$-3 indicate Wi-Fi automatic switching of a user plane, Wi-Fi automatic switching of a flow, Wi-Fi automatic switching of a bearer and Wi-Fi automatic switching of data. Definition of a procedure for, at a UE which wishes to be connected to an AP in an idle state, requesting state switching of the AP is necessary.

When cellular-Wi-Fi U-plane automatic switching is performed according to $\hat{2}$-1, all data is transmitted using Wi-Fi only. When cellular-Wi-Fi U-plane is switched to simultaneous transmission according to $\hat{2}$-2 and $\hat{2}$-3, simultaneous data transmission via Wi-Fi and cellular network using a bandwidth segregation or aggregation scheme is possible. Here, in bandwidth segregation, automatic switching is performed per flow (service/IP flow) as in $\hat{2}$-2 and different flows are transmitted via different RATs. In $\hat{2}$-2, automatic switching per flow may be automatic switching per one or more service/IP flow(s). That is, switching may be performed per flow ($\hat{2}$-2-1) or per data radio (or EPS) bearer ($\hat{2}$-2-2). In bandwidth aggregation, the same flow may be transmitted via different RATs in data units, as in $\hat{2}$-3.

After Wi-Fi automatic switching has been performed as in $\hat{2}$, cellular link control based on Wi-Fi is possible as in CD. Control for cellular link paging or radio link failure may be received via a Wi-Fi link.

Figure 4B:
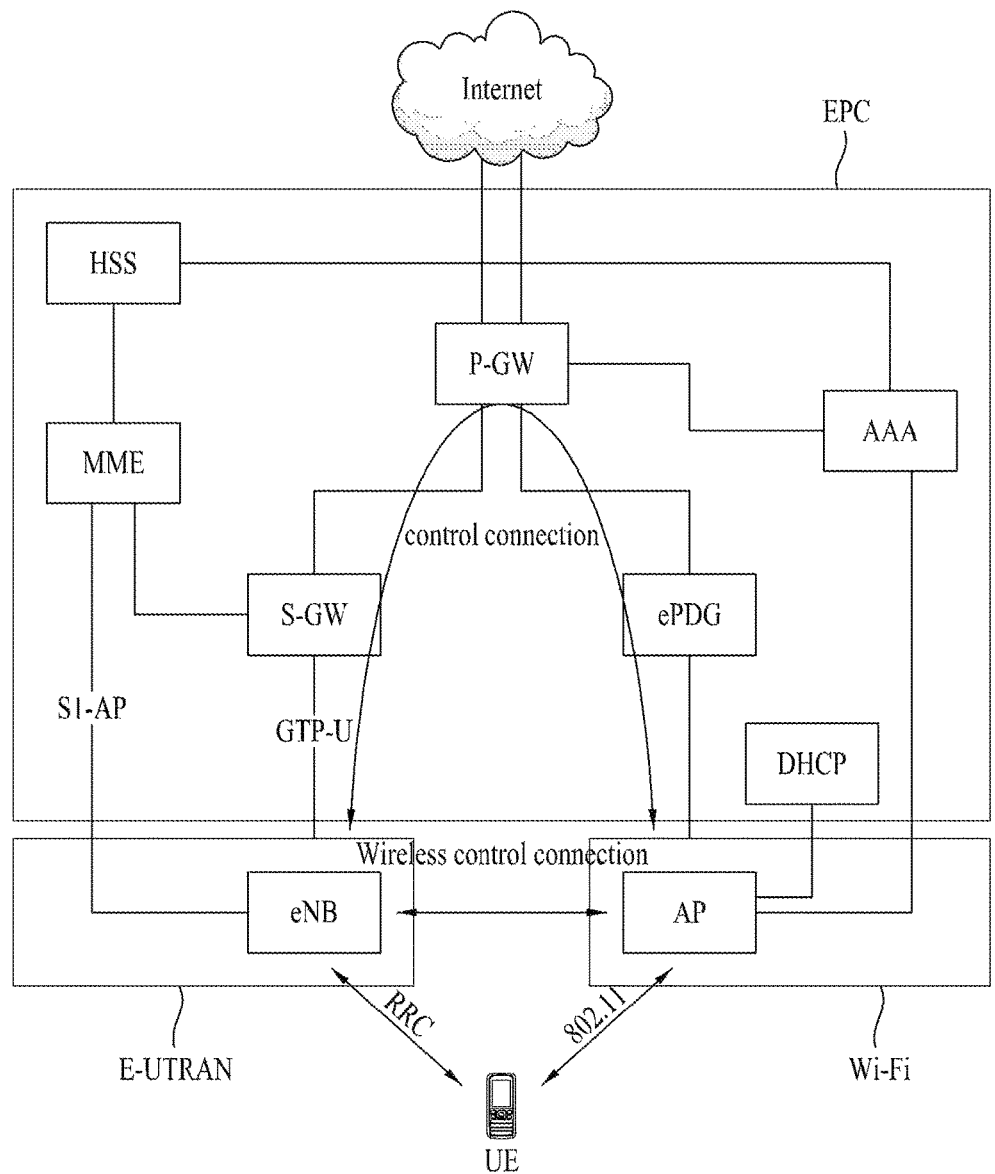

FIG. 4B is a diagram showing a multi-RAT environment according to another embodiment of the present invention. In the multi-RAT environment shown in FIG. 4B, two different RATs are merged. Assume that a first RAT is a cellular system (e.g., an LTE/LTE-A or WiBro system) and a second RAT is a Wi-Fi system. The present invention is not limited thereto. In the Multi-RAT environment of FIG. 4B, control connection for interworking between the first and the second RAT is provided. The control connection, for example, may be a wireless control connection between an eNB of the first RAT and an eNB of the second RAT or a wired control connection through a backbone network such as P-GW(Public data network Gateway) or EPC(Evolved Packet Core).

In order to increase overall system energy efficiency, an interworking entity (hereinafter, referred to as an IWE) of the multi-RAT may instruct Tx/Rx power of a specific RAT to be turned on/off or control status transition of a node (e.g., AP) of the specific RAT, under specific conditions. In an AP jamming environment, interference mitigation between APs may also be controlled by the IWE.

Although the IWE may be an arbitrary node located in the first RAT, for example, the cellular network, it is assumed that an interworking function is performed in the following three entities. Accordingly, the IWE may be any one of (1), (2) and (3) and the present invention is not limited thereto.

(1) eNB—reuse of an existing entity
(2) MME—reuse of an existing entity
(3) interworking management entity (IWME)—definition of a new entity Before the UE simultaneously accesses multiple RATs, the IWE may aid the UE in selecting an optimal RAT or AP. To this end, the IWE may collect information on the second RAT such as Wi-Fi from the UE or the AP in advance.

For peak throughput and data traffic offloading, the UE may simultaneously support the first RAT and the second RAT via multi-RAT interworking. Here, the first RAT may be referred to as a primary network or a primary system and the second RAT may be referred to as a secondary network or a secondary system. For example, the UE may be configured to simultaneously support LTE/LTE-A and Wi-Fi (near field communication system such as WLAN/802.11). Such UE may be referred to as a multi-system capability UE in the present specification.

In the network structure shown in FIG. 4B, the primary system has wider coverage and may be a network for control information transmission. Examples of the primary system include a WiMAX or LTE (LTE-A) system. The secondary system has narrow coverage and may be a system for data transmission. Examples of the secondary network include a wireless local area network system such as WLAN or Wi-Fi.

The embodiments of the present invention will be described on the following assumptions.

An interworking function is related to an interworking related procedure which may occur between eNB-UEs or eNB-APs and an IWE stores/manages AP information. The IWE stores/manages information on APs located in coverage thereof. Assume that the AP of the secondary system (e.g., Wi-Fi) and the IWE of the Primary system (e.g., LTE or WiMAX) may share necessary information via a control connection. In order to enable the AP and the IWE to share information, the following methods 1) to 4) may be used.

Method 1) Wired control connection

A network interface is established via a backbone network.

Method 2) Wireless control connection

According to Method 2), the AP has an air interface with the eNB and may be referred to as an eAP. For example, the eAP supports an LTE protocol stack for communication with the eNB as well as 802.11 MAC/PHY. The eAP may be regarded as an LTE UE in a relationship with the eNB and may communicate with the eNB.

Method 3) The AP and the IWE collect information on each other via a server rather than via an existing network such as an access network discovery service function (ANDSF).

In the embodiments of the present invention, the AP may switch the state thereof to an ON/OFF state (or an active/idle (sleep) mode) for overall system efficiency. The information on the AP, for example, state information, may be stored and managed by the IWE. As a method for, at the IWE, storing and managing the information on the AP, the following four methods A to D may be used depending on by which entity of the first RAT the IWE is implemented and the present invention is not limited thereto.

Method A) An air interface between the eNB and the AP is used.

The eNB controls the AP using a wireless control connection with the AP, similarly to a general UE.

Method B) A backhaul interface between the eNB and the AP is used.

The eNB controls the AP using a wired control connection with the AP.

Method C) A control interface between the MME and the AP is used.

The AP is controlled using a control connection between the MME and the AP (that is, the secondary system).

Method D) A control interface between the IWME and the AP is used.

The AP is controlled using a control connection between the IWME and the AP (that is, the secondary system).

Figure 5:
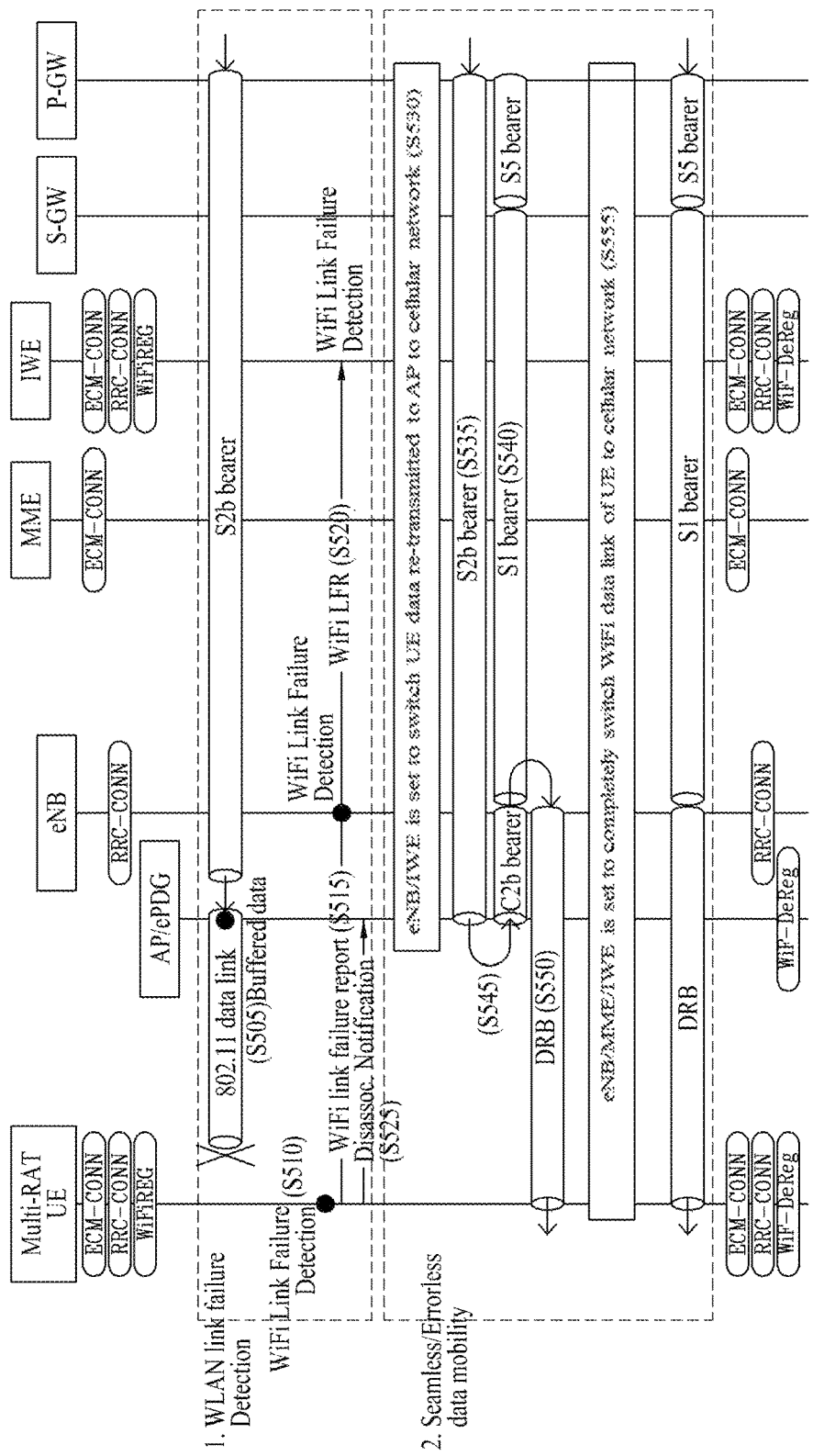
FIG. 5 is a diagram illustrating a method for managing link failure according to an embodiment of the present invention.

FIG. 5 is a diagram illustrating a method for managing link failure according to an embodiment of the present invention.

Referring to FIG. 5, a UE can simultaneously access an AP and an eNB, the AP may be, for example, an eNB of a wireless LAN network, and the eNB may be an eNB of a cellular network. A serving gateway (S-GW) may manage mobility of a user plane and may be responsible for data transmission and reception between an eNB and a packet data network gateway (P-GW). In addition, the S-GW may be responsible for a function of a mobile anchor when the UE performs handover. The P-GW may be a gateway for access to a packet data network (PDN) in an evolved packet core (EPC). The UE is assumed to simultaneously access the AP and the eNB.

The procedure illustrated in FIG. 5 is largely classified into 1. WLAN link failure detection procedure and 2. Seamless/Errorless data mobility procedure.

When link between the UE and the AP is disconnected, the AP may buffer DL data to be transmitted to the UE (S505). The UE may detect that data link with the AP is disconnected (S510) and transmits link failure report (LFR) to the eNB (S515). The LFR may be a message for indicating that link between the UE and the AP is disconnected and may include at least one of a code indicating the reason for disconnection of a link with an ID AP of the AP, QoS information of disconnected link with the AP, a request for switching the disconnected link with the AP to link with an eNB, and a first timer indicating a deadline for switching the link with the AP into link with the eNB. An ID of the AP may be an ID used in a WLAN such as a BSSID and a SSID. When the AP is an eAP with a wired/wireless backhaul interface with the eNB, the ID of the AP may be an ID of the AP defined in a cellular network as well as a WLAN.

The eNB may start a first timer at a time point for receiving the LFR and switch link with the AP into link with the eNB until the first timer expires. When link switching fails until the first timer expires, the eNB may newly start setting for addition of DRB with the UE.

The UE may transmit the disassociation notification to the AP (S525). For example, when the UE has data link that is transmitted and received to and from the AP and needs to transmit the disassociation notification for specific reason, the UE may transmit a release notification message set for switching request of data link for requesting switching data link to the eNB, to the AP. The disassociation notification may include a parameter for switching request of data link. The disassociation notification may include a second timer indicating time for buffering downlink data of a UE in an AP after disconnection of the link. For example, the AP may start the second timer from a time point for receiving release notification or a time point for disconnecting link with the UE. The AP may buffer downlink data of the UE until the second timer expires. When the second timer expires, the AP may disregard downlink data of the UE. However, when there is separate request from an IWE or an eNB, even if the second timer expires, downlink data of the UE may not be discarded. According to an embodiment of the present invention, the second timer and the first timer may be set to be the same value.

The eNB that receives the LFR from the UE may transmit the LFR to the IWE in order to indicate that link between the UE and the AP is disconnected to the IWE (S520). The eNB may transmit the LFR to request the IWE to switch flow of downlink data of the UE, transmitted to the AP, to the eNB.

The eNB and the IWE that receive the LFR may be set to transmit data buffered in the AP to a cellular network (S530). For example, the eNB may set a bearer of an AP and X2b interfaces the eNB may set an S-GW and an S1 bearer (S540). The bearer of the X2b interface may be set using an ID of an AP, included in the LFR. For example, the eNB may identify an AP that transmits and receives data to and from the UE using the ID of the AP and set the identified AP and bearer.

When the P-GW transmits downlink data of the UE to the AP (S535), the AP may forward downlink data to the eNB through the X2b bearer. The eNB may transmit the forwarded downlink data of the UE to the UE through the DRB (S550).

In other words, the eNB may relay downlink data of the UE, buffered in the AP, to the UE from the AP until flow is switched from link between the UE and the AP is disconnected. When flow is switched, the S-GW may transmit the downlink data of the UE to the eNB without transmission to the AP (S555).

Figure 7:
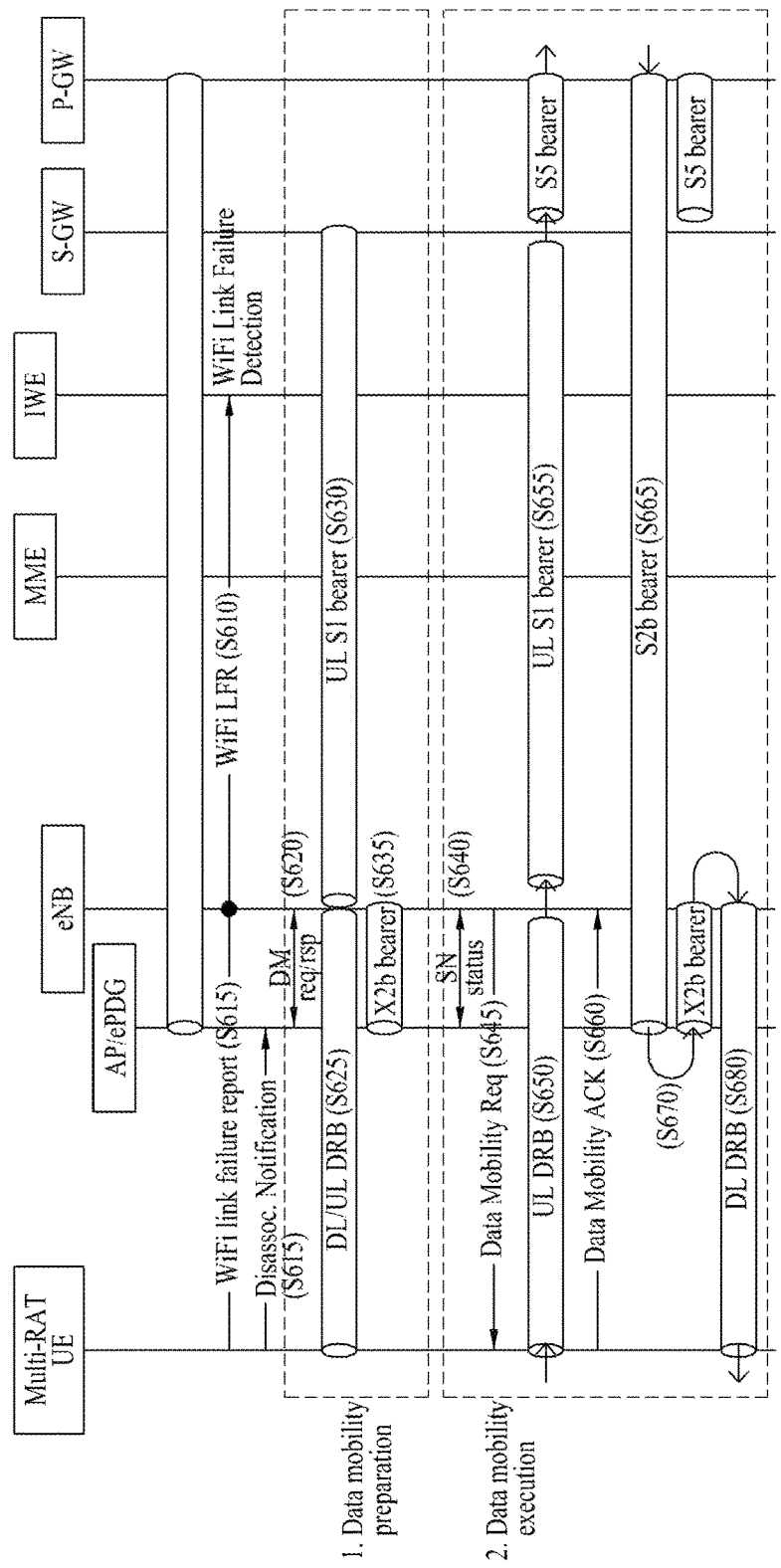
FIG. 7 is a diagram illustrating a method for managing link failure according to another embodiment of the present invention.

FIG. 7 is a diagram illustrating a method for managing link failure according to another embodiment of the present invention. A repeated description in the aforementioned embodiments will be omitted here.

A UE may transmit link failure report (LFR) to an eNB (S605). The eNB may transmit the LFR to an IWE (S610). The UE may transmit disassociation notification to an AP (S615).

The AP may transmit a data mobility request to the eNB and the eNB may transmit data mobility response to the AP (S620). The data mobility request may include at least one of an ID of the eNB, UE context information, an ID of the UE, and QoS related information of the UE.

For example, the eNB that receives the data mobility request may generate an ID of a data radio bearer (DRB) to be used between the eNB and the UE and a tunneling endpoint identifier (TEID) of an AP in a direct tunnel between the AP and the eNB. The eNB may establish an S-GW and UL S1 Bearer in order to transmit UL data of the UE (S630) and establish a UE and DL/UL DRB bearer (S625). In addition, the eNB may establish an X2b bearer in order to receive DL data from the AP (S635). Through this, a direct tunnel for DL data forwarding of the UE between the AP and the eNB may be generated. The data mobility response may include a TEID and E-RAB ID of the eNB. The AP may transmit data of the UE, which is being buffered using the received TEID, to the eNB.

Figure 6:
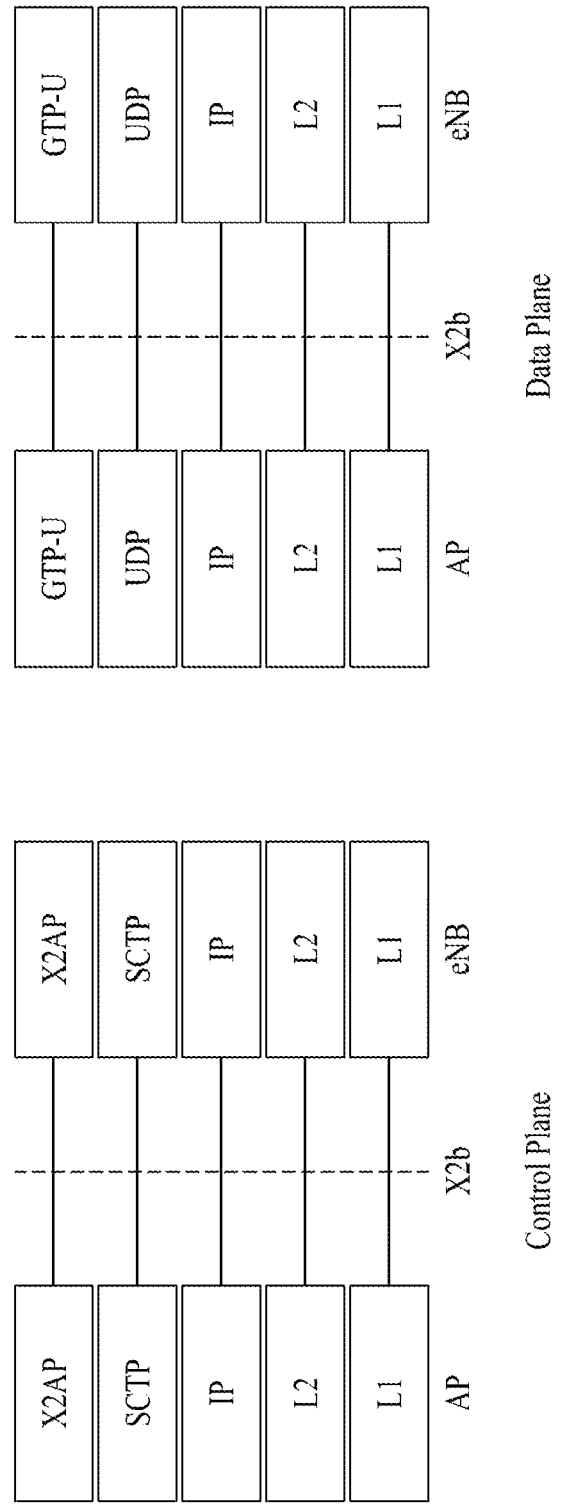
FIG. 6 is a diagram illustrating a protocol stack of an X2b interface for generation of a direct tunnel.

FIG. 6 is a diagram illustrating a protocol stack of an X2b interface for generation of a direct tunnel. When an eNB and an AP are connected through a wireless interface, the eNB may establish a data radio bearer (DRB) for a data plane of a direct tunnel through a protocol stack including only an L1 layer and an L2 layer and transmit control information to the AP via RRC signaling.

When the eNB and the AP are connected through a wired interface, a GTP tunnel for a data plane of the directed tunnel may be established through a GPRS tunneling protocol (GTP)-U protocol stack, and control information may be transmitted to the AP via X2AP signaling.

The AP may transmit SN status transfer to the eNB (S640). The SN status transfer may include DL count and UL count. The eNB may know a first packet to be transmitted and received to and from the UE through the SN status transfer. For example, the eNB may acquire a sequence number (SN) of D1 data that is transmitted to the UE before link between the UE and AP is disconnected, through the direct tunnel. The AP may transmit the SN status transfer and then transmit the buffered DL data to the eNB.

The eNB may instruct the UE to transmit and receive data that is being transmitted and received to and from the AP, through the eNB (S645). For example, the eNB may transmit data mobility request including the DRB ID (DL/UL) to the UE so as to indicate a DRB ID, to which data transmitted and received to and from the AP is to be mapped, to the UE.

The UE may transmit data mobility ACK to the eNB (S660).

The UE may transmit UL data transmitted to the AP to the eNB through the UL DRB (S650). The eNB may transmit UL data of the UE to the S-GW through the UL 51 bearer (S655).

The AP may receive DL data of the UE from a P-GW through the S2b bearer (S665) and forward DL data of the UE to the eNB through the X2b bearer (S670). The eNB may transmit DL data that has been received from the AP through the DL DRB, to the UE (S680).

Figure 8:
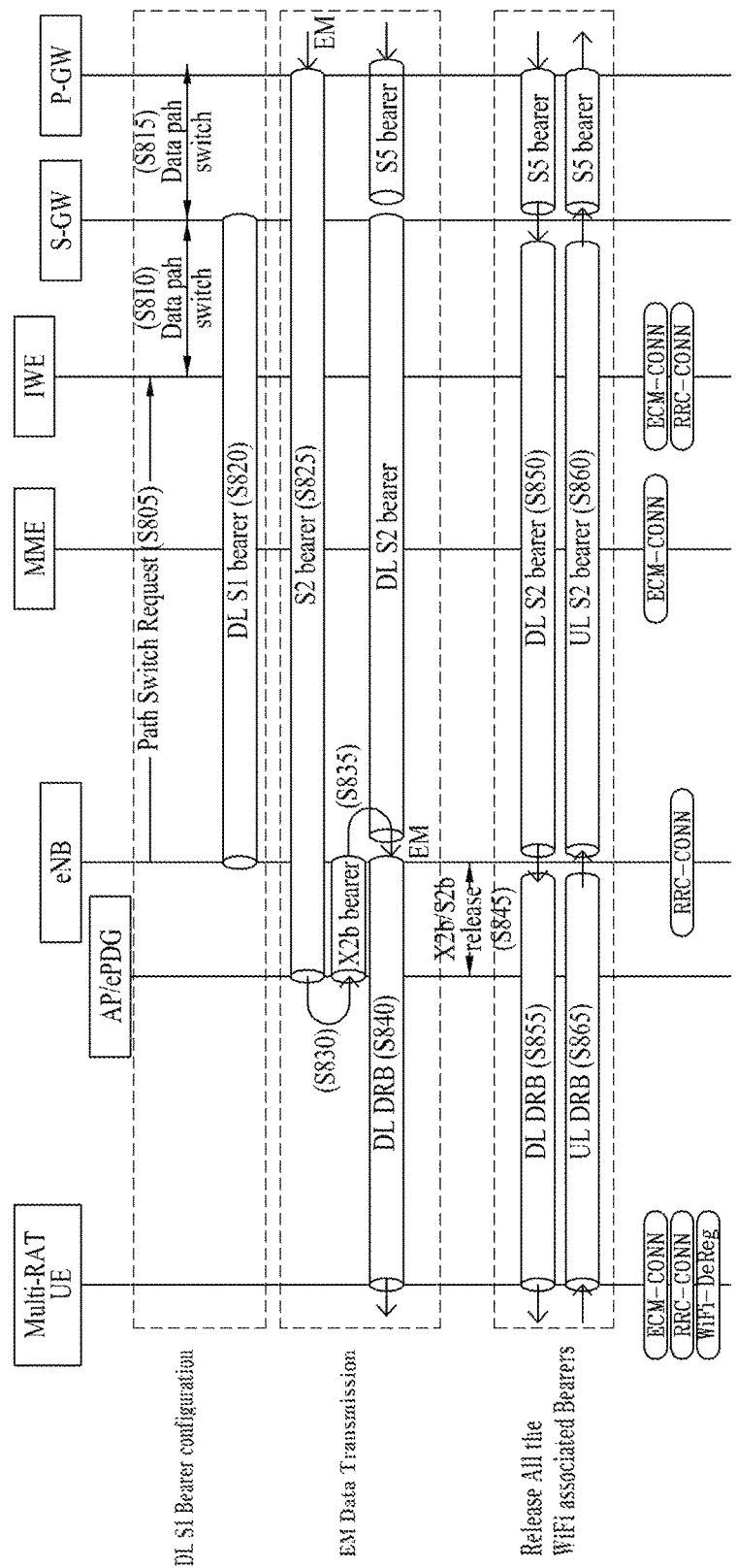
FIG. 8 is a diagram illustrating a method for managing link failure according to another embodiment of the present invention.

FIG. 8 is a diagram illustrating a method for managing link failure according to another embodiment of the present invention. A repeated description in the aforementioned embodiments will be omitted here.

First, a procedure for establishing a DL S1 bearer between the eNB and the IWE will be described. The eNB may transmit a path switch request to the IWE (S805). The path switch request may be a message indicating that a cell served by the UE is changed to the eNB from the AP and requesting switching of data flow.

The IWE may transmit a flow/IP binding update (data path switch related) message to the S-GW/P-GW so as to change data flow, which is being changed to the AP, to the eNB (S810 and S815). In this case, the S-GW may establish a DL S1 bearer to the eNB (S820).

Next, transmission of an end marker will be described. The P-GW may transmit data through an S2b bearer together with an end marker (EM) indicating end of data transmitted to the AP (S825). The AP may forward data including the EM to the eNB (S830). The eNB that receive transmitted data together with the EM may know that there is no UE data transmitted from the AP any longer. Accordingly, the eNB may transmit data transmitted to the DL S1 bearer directly to the UE.

The eNB that receives the EM may transmit an X2b/S2b bearer release message indicating that information about the UE is entirely released, to the AP, and the AP that receives the X2b/S2b bearer release message may release the S2b bearer about the UE (S845). The IWE may transmit a path switch request ACK message to the eNB so as to indicate that data flow is switched, to the eNB. The eNB may instruct the AP to release X2b bearer establishment and UE context because data flow of the UE has been completely switched.

The P-GW may transmit data after the EM to the eNB through the newly established DL S1 bearer (S850).

Figure 9:
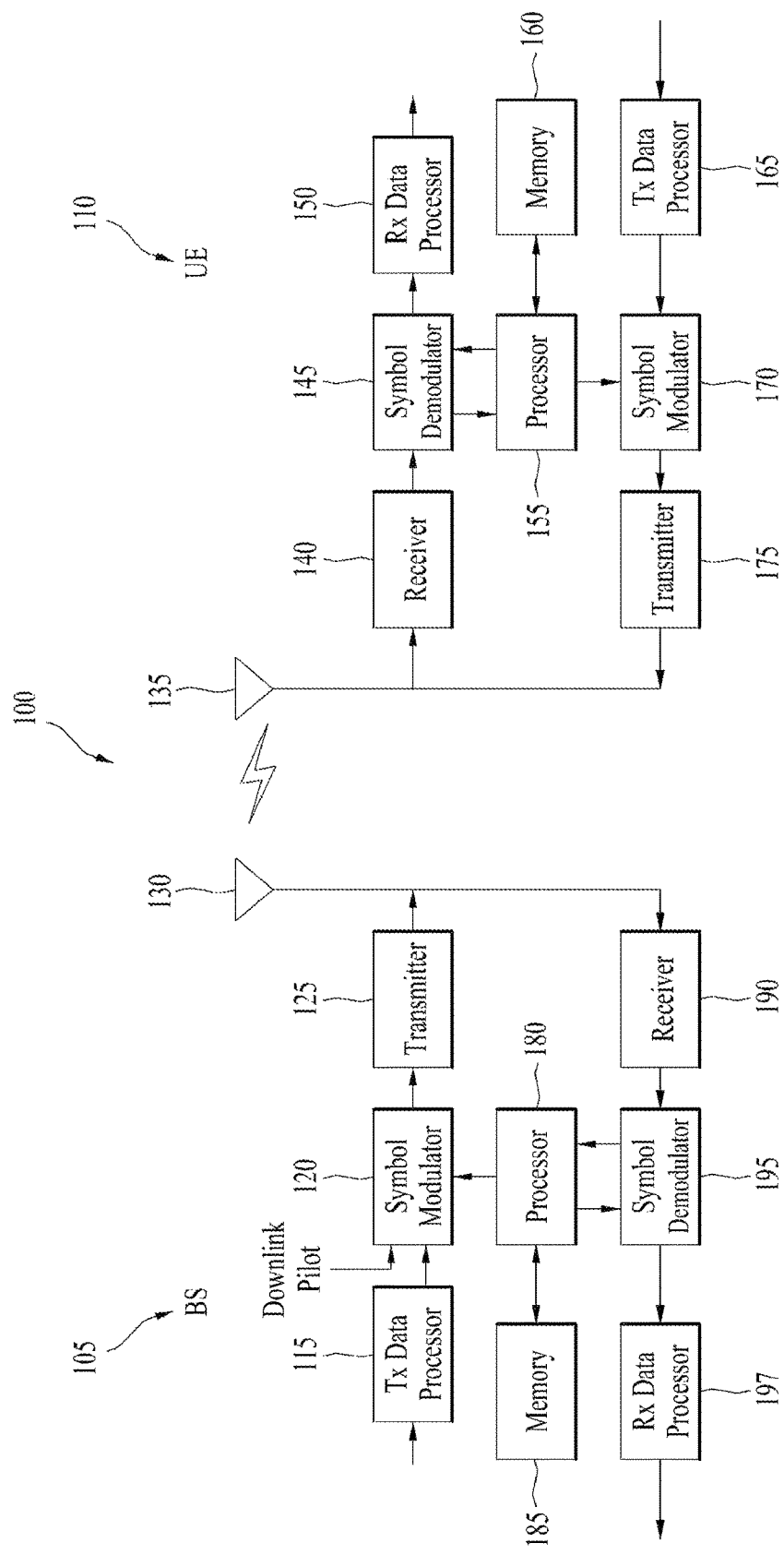
FIG. 9 is a diagram illustrating a UE and an eNB according to an embodiment of the present invention.

FIG. 9 is a diagram illustrating a UE and an eNB according to an embodiment of the present invention. A repeated description in the aforementioned embodiments will be omitted here. It would be obvious to one of ordinary skill in the art that the aforementioned embodiments are implemented by the UE and the eNB illustrated in FIG. 9.

The eNB illustrated in FIG. 9 may be an IWE of a first RAT or an eNB (e.g., AP) of a second RAT. A RAT 100 may be the aforementioned first RAT or second RAT. Although FIG. 9 illustrates one eNB 105 and one UE 110 (which includes a D2D UE), the RAT 100 may include one or more eNBs and/or one or more UEs.

Referring to FIG. 9, the base station 105 may include a transmission (Tx) data processor 115, a symbol modulator 120, a transmitter 125, a transmit/receive antenna 130, a processor 180, a memory 185, a receiver 190, a symbol demodulator 195, and a reception (Rx) data processor 197. The UE 110 may include a Tx data processor 165, a symbol modulator 170, a transmitter 175, a transmit/receive antenna 135, a processor 155, a memory 160, a receiver 140, a symbol demodulator 155, and an Rx data processor 150. Although one antenna 130 and one antenna 135 are respectively included in the base station 105 and the UE 110, each of the base station 105 and the UE 110 includes a plurality of antennas. Accordingly, the base station 105 and the UE 110 according to the present invention support a Multiple Input Multiple Output (MIMO) system. The base station 105 and the UE 110 according to the present invention support both a Single User-MIMO (SU-MIMO) scheme and a Multi User-MIMO (MU-MIMO) scheme.

In downlink, the Tx data processor 115 receives traffic data, formats and codes the received traffic data, interleaves and modulates the coded traffic data (or performs symbol mapping), and provides modulated symbols ("data symbols"). The symbol modulator 120 receives and processes the data symbols and pilot symbols and provides a symbol stream.

The symbol modulator 120 multiplexes data and pilot signals and transmits the multiplexed data to the transmitter 125. At this time, the transmitted symbols may be data symbols, pilot symbols or zero signal values. In each symbol period, the pilot symbols may be consecutively transmitted. The pilot symbols may be Frequency Division Multiplexed (FDM), Orthogonal Frequency Division Multiplexed (OFDM), Time Division Multiplexed (TDM) or Code Division Multiplexed (CDM) symbols.

The transmitter 125 receives and converts the symbol stream into one or more analog signals, additionally adjusts (e.g., amplifies, filters, and frequency-up-converts) the analog signals, and generates a downlink signal suitable for transmission through a radio channel. Subsequently, the downlink signal is transmitted to the UE through the antenna 130.

In the UE 110, the receive antenna 135 receives the downlink signal from the eNB and provides the received signal to the receiver 140. The receiver 140 adjusts (e.g., filters, amplifies, frequency-down-converts) the received signal and digitizes the adjusted signal so as to acquire samples. The symbol demodulator 145 demodulates the received pilot symbols and provides the demodulated pilot symbols to the processor 155, for channel estimation.

The symbol demodulator 145 receives downlink frequency response estimation values from the processor 155, performs data demodulation with respect to the received data symbols, acquires data symbol estimation values (which are estimation values of the transmitted data symbols), and provides the data symbol estimation values to the Rx data processor 150. The Rx data processor 150 demodulates (that is, symbol-demaps and deinterleaves) the data symbol estimation values, decodes the demodulated values, and restores transmitted traffic data.

The processes performed by the symbol demodulator 145 and the Rx data processor 150 are complementary to the processes performed by the symbol modulator 120 and the Tx data processor 115 of the base station 105.

In the UE 110, in uplink, the Tx data processor 165 processes the traffic data and provides data symbols. The symbol modulator 170 receives the data symbols, multiplexes the data symbols, performs modulation with respect to the symbols and provides a symbol stream to the transmitter 175. The transmitter 175 receives and processes the symbol stream, generates an uplink signal, and transmits the uplink signal to the base station 105 through the transmit antenna 135.

The base station 105 receives the uplink signal from the UE 110 through the receive antenna 130 and the receiver 190 processes the received uplink signal and acquires samples. Subsequently, the symbol demodulator 195 processes the samples and provides pilot symbols received in the uplink and data symbol estimation values. The Rx data processor 197 processes the data symbol estimation values and restores traffic data transmitted from the UE 110.

The respective processors 155 and 180 of the UE 110 and the base station 105 instruct (e.g., control, adjust, manages, etc.) the respective operations of the UE 110 and the base station 105. The processors 155 and 180 may be connected to the memories 160 and 185 for storing program codes and data. The memories 160 and 185 may be respectively connected to the processors 155 and 180 so as to store operating systems, applications and general files.

Each of the processors 155 and 180 may also be referred to as a controller, a microcontroller, a microprocessor, a microcomputer, etc. The processors 155 and 180 may be implemented by hardware, firmware, software, or a combination thereof. If the embodiments of the present invention are implemented by hardware, Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc. may be included in the processors 155 and 180.

If the embodiments of the present invention are implemented by firmware or software, the firmware or software may be configured to include modules, procedures, functions, etc. for performing the functions or operations of the present invention. The firmware or software configured to perform the present invention may be included in the processors 155 and 180 or may be stored in the memories 160 and 185 so as to be driven by the processors 155 and 180.

Layers of the radio interface protocol between the UE and the eNB in the wireless communication system (network) may be classified into a first layer (L1), a second layer (L2) and a third layer (L3) based on the three low-level layers of the well-known Open System Interconnection (OSI) model of a communication system. A physical layer belongs to the first layer and provides an information transport service through a physical channel. A Radio Resource Control (RRC) layer belongs to the third layer and provides control radio resources between the UE and the network. The UE and the eNB exchange RRC messages with each other through a wireless communication network and the RRC layer.

In the present specification, although the processor 155 of the UE and the processor 180 of the base station perform process signals and data except for a data transmission/reception function and a storage function of the UE 110 and the base station 105, for convenience of description, the processors 155 and 180 are not specially described. Although the processors 155 and 180 are not specially described, the processors 155 and 180 may perform a series of operations such as data processing except for a signal transmission/reception function and a storage function.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

The invention claimed is:

1. A method for controlling link failure by a user equipment (UE) that simultaneously accesses multi-radio access technology (RAT), the method comprising:
   transmitting, to a second base station (BS) of a second RAT, a message requesting that a second link between the UE and the second BS be switched to a first link between a first BS of a first RAT and the second BS;
   wherein the message includes information of a first timer indicating a time duration for buffering downlink data for the UE by the second BS;
   transmitting, to the first BS, a link failure report (LFR) indicating a failure of the second link;
   wherein when an instruction associated with data reception is transmitted to the second BS before the first timer expires, receiving, from the first BS, the downlink data for the UE, buffered in the second BS, and
   wherein the downlink data for the UE, buffered in the second BS, is received by the UE through a direct tunnel between the first BS and the second BS, established based on the LFR of the UE.

2. The method according to claim 1, wherein the LFR comprises at least one of an ID of the second BS, a code indicating the reason link of failure, QoS information of the second link, a request of the UE for switching the second link, and a second timer indicating a deadline for switching the second link.

3. The method according to claim 2, further comprising:
starting a setting for adding a data radio bearer (DRB) to the first BS when the second link is not added to the first BS until the second timer expires.

4. A user equipment (UE) that simultaneously accesses multi-radio access technology (RAT), the UE comprising:
a transmitter and a receiver; and
a processor,
wherein the processor controls the transmitter to transmit, to a second base station (BS) of a second RAT, a message requesting that a second link between the UE and the second BS be switched to a first link between a first BS of a first RAT and the second BS;
wherein the message includes information of a first timer indicating a time duration for buffering downlink data for the UE by the second BS;
wherein the processor further controls the transmitter to transmit, to the first BS, a link failure report (LFR) indicating a failure of the second link;
wherein when an instruction associated with data reception is transmitted to the second BS before the first timer expires, the processor controls the receiver to receive, from the first BS, the downlink data for the UE, buffered in the BS of the second RAT, after the link is disconnected; and
wherein the downlink data for the UE, buffered in the second BS, is received by the UE through a direct tunnel between the first BS and the second BS, established based on the LFR of the UE.

* * * * *